(12) United States Patent
Hud

(10) Patent No.: US 12,594,964 B2
(45) Date of Patent: Apr. 7, 2026

(54) METHOD OF AND SYSTEM FOR GENERATING REFERENCE PATH OF SELF DRIVING CAR (SDC)

(71) Applicant: YANDEX SELF DRIVING GROUP LLC, Moscow (RU)

(72) Inventor: Pavel Sergeevich Hud, Minsk (BY)

(73) Assignee: DIRECT CURSUS TECHNOLOGY L.L.C, Dubai (AE)

( * ) Notice: Subject to any disclaimer, the term of this patent is extended or adjusted under 35 U.S.C. 154(b) by 916 days.

(21) Appl. No.: 17/126,888

(22) Filed: Dec. 18, 2020

(65) Prior Publication Data

US 2021/0197862 A1    Jul. 1, 2021

(30) Foreign Application Priority Data

Dec. 25, 2019    (RU) ........................... RU2019143946

(51) Int. Cl.
*B60R 21/00* (2006.01)
*B60W 60/00* (2020.01)
(Continued)

(52) U.S. Cl.
CPC ..... *B60W 60/0015* (2020.02); *G01C 21/3461* (2013.01); *G01C 21/3492* (2013.01);
(Continued)

(58) Field of Classification Search
CPC ............. B60W 60/0015; B60W 30/09; B60W 2420/52; B60W 2556/10; B60W 2520/10;
(Continued)

(56) References Cited

U.S. PATENT DOCUMENTS 9,227,632 B1 *   1/2016   Lee ................... B60W 30/0956
9,310,804 B1 *   4/2016   Ferguson ............ G06V 20/588
(Continued)

FOREIGN PATENT DOCUMENTS

CN    107563040 A      1/2018
CN    108657179 A  * 10/2018  ............ B60W 10/06
(Continued)

OTHER PUBLICATIONS

Suzuki "Automatic Two-Lane Path Generation for Autonomous Vehicles Using Quartic B-Spline Curves", IEEE Transactions on Intelligent Vehicles, vol. 3, No. 4, pp. 547-558, Dec. 2018, doi: 10.1109/TIV.2018.2874532.
(Continued)

*Primary Examiner* — Adam R Mott
*Assistant Examiner* — Byron Xavier Kasper
(74) *Attorney, Agent, or Firm* — BCF LLP

(57)    ABSTRACT

A method and device for amending a reference path associated with a vehicle are disclosed. The method includes: (i) acquiring road segment data and reference path data, the reference path data having a plurality of anchor points defining the reference path along the road segment, (ii) using the road segment data and the reference path data to determine a safe deviation interval for each one of the plurality of anchor points, a given safe deviation interval for a given anchor point being indicative of an acceptable deviation of the vehicle from the reference path; and (iii) using the safe deviation intervals to determine an amended path for the vehicle instead of the reference path, such that by following the amended path the vehicle falls within the constraints of the road segment.

17 Claims, 9 Drawing Sheets

(51) Int. Cl.

| | |
|---|---|
| *B64C 39/00* | (2023.01) |
| *B64C 39/02* | (2023.01) |
| *G01C 21/34* | (2006.01) |
| *G05D 1/00* | (2006.01) |
| *G05D 1/10* | (2006.01) |
| *G08G 5/04* | (2006.01) |
| *B60W 30/09* | (2012.01) |

(52) U.S. Cl.
CPC ......... *G05D 1/0088* (2013.01); *G05D 1/0214*
(2013.01); *B60W 30/09* (2013.01); *B60W*
*2420/408* (2024.01); *B60W 2556/10* (2020.02)

(58) Field of Classification Search
CPC ......... B60W 2552/00; B60W 2552/53; B60W
2555/60; B60W 30/095; B60W 60/001;
B60W 60/0027; B60W 2556/40; B60W
2552/30; G01C 21/3461; G01C 21/3492;
G05D 1/0088; G05D 1/0214; G05D
2201/0213; G05D 1/10; G05D 1/0055;
G06V 20/56; B60R 21/00; B64C 39/00;
B64C 39/02; G08G 5/04
See application file for complete search history.

(56) References Cited

U.S. PATENT DOCUMENTS

| | | | | |
|---|---|---|---|---|
| 9,911,346 | B2 | 3/2018 | Klinger et al. | |
| 10,928,820 | B1 * | 2/2021 | Tao ...................... | G05D 1/0214 |
| 11,513,519 | B1 * | 11/2022 | Akella ................ | B60W 30/181 |
| 2005/0043881 | A1 * | 2/2005 | Brulle-Drews .... | G01C 21/3644 |
| | | | | 701/521 |
| 2011/0035148 | A1 * | 2/2011 | Machino ............ | G01C 21/3415 |
| | | | | 701/533 |

| | | | | |
|---|---|---|---|---|
| 2013/0090802 | A1 * | 4/2013 | Curtis .................. | G05D 1/0278 |
| | | | | 701/25 |
| 2017/0247032 | A1 | 8/2017 | Lee et al. | |
| 2018/0188734 | A1 * | 7/2018 | Zhu ...................... | G08G 1/0125 |
| 2018/0189578 | A1 * | 7/2018 | Yang ..................... | B60W 40/04 |
| 2019/0016339 | A1 * | 1/2019 | Ishioka ............... | B60W 50/082 |
| 2019/0278277 | A1 * | 9/2019 | Tao .................... | B60W 30/0956 |
| 2020/0094825 | A1 * | 3/2020 | Kato .................... | G06V 20/588 |
| 2020/0174490 | A1 * | 6/2020 | Ogale ................... | G06N 3/084 |
| 2020/0398894 | A1 * | 12/2020 | Hudecek .............. | G05D 1/0214 |
| 2021/0074037 | A1 * | 3/2021 | Zhu ...................... | G05D 1/0088 |
| 2021/0096568 | A1 * | 4/2021 | Kumar ................... | G01S 17/89 |
| 2021/0181741 | A1 * | 6/2021 | Yao .................... | G01C 21/3407 |
| 2021/0192748 | A1 * | 6/2021 | Morales Morales .. | G06V 10/82 |

FOREIGN PATENT DOCUMENTS

| | | | |
|---|---|---|---|
| CN | 106647773 B | | 9/2019 |
| JP | 5362691 B2 | | 12/2013 |
| JP | 2015191650 A | * | 11/2015 |
| KR | 20170050499 A | | 5/2017 |

OTHER PUBLICATIONS

Russian Search Report dated Feb. 12, 2021 issued in respect of the counterpart Russian Patent Application No. RU2019143946.
Jian, "High-Definition Map Combined Local Motion Planning and Obstacle Avoidance for Autonomous Driving", 2019 EEE Intelligent Vehicles Symposium (IV), Jun. 9-12, 2019, pp. 2180-2186, doi: 10.1109/IVS.2019.8814229.
Kuwata, "Real-Time Motion Planning With Applications to Autonomous Urban Driving," IEEE Transactions on Control Systems Technology, vol. 17, No. 5, pp. 1105-1118, Sep. 2009, doi: 10.1109/TCST.2008.2012116.
European Search Report dated Apr. 29, 2021 issued in respect of the counterpart European Patent Application No. EP20206620.5.

* cited by examiner

METHOD OF AND SYSTEM FOR GENERATING REFERENCE PATH OF SELF DRIVING CAR (SDC)

CROSS-REFERENCE

The present application claims priority to Russian Patent Application No. 2019143946, entitled "Method of and System for Generating Reference Path of Self Driving Car (SDC)", filed Dec. 25, 2019, the entirety of which is incorporated herein by reference.

FIELD OF TECHNOLOGY

The present technology relates to self-driving cars and, specifically, to a method of and a system for generating a reference path of a self-driving car.

BACKGROUND

Several computer based navigation systems that are configured for aiding navigation and/or control of vehicle have been proposed and implemented in the prior art. These systems range from more basic map-aided localization based solutions—i.e. use of a computer system to assist a driver in navigating a route from a starting point to a destination point; to more complex ones—computer-assisted and/or driver-autonomous driving systems.

Some of these systems are implemented as what is commonly known as a "cruise control" system. Within these systems, the computer system boarded on the vehicles maintains a user-set speed of the vehicle. Some of the cruise control system implement an "intelligent distance control" system, whereby the user can set up a distance to a potential car in front (such as, select a value expressed in a number of vehicles) and the computer system adjusts the speed of the vehicle at least in part based on the vehicle approaching the potential vehicle in front within the pre-defined distance. Some of the cruise control systems are further equipped with a collision control system, which systems upon detection of the vehicle (or other obstacle) in front of the moving vehicle, slow down or stop the vehicle.

Some of the more advanced systems provide for a fully autonomous driving of the vehicle without direct control from the operator (i.e. the driver), so-called Self-Driving Cars (SDCs). A given SDC includes computer systems that can cause the SDC to accelerate, brake, stop, change lane and self-park.

One of the technical challenges in implementing the above computer systems is planning an SDC operation when approaching a turn.

SUMMARY

It is an object of the present technology to ameliorate at least some of the inconveniences present in the prior art. Embodiments of the present technology may provide and/or broaden the scope of approaches to methods of achieving the aims and objects of the present technology.

A Self-Driving Car (SDC) is typically equipped with an electronic device and various sensors. For example, the electronic device may be configured to receive and process data about lanes on a road segment on which the SDC is travelling, such as data indicative of lane geometry, shape and boundaries, for example. Also, the electronic device may be configured to receive and process data about objects in the surroundings of the SDC, such as data indicative of object types, movement of objects, and geometry of objects, for example.

It should be noted that lanes may have various characteristics and shapes. For instance, some lanes may be substantially straight lanes, while others may have a curve (such as a curve on a highway), may be U-shaped lanes and/or L-shaped lanes, such as turning lanes. Also, lanes on a road segment can typically be defined by a left boundary and a right boundary, and by having a center line in between those boundaries.

Developers of the present technology have realized that, under normal conditions, a reference path of a vehicle, i.e. the anchor point of the lane along which the vehicles ought to move along is the center line of a given lane. This can be done for safety purposes, for example. Hence, under normal conditions, a SDC ought to be travelling along a default reference path that corresponds to the center line of the lane. In one example, a midpoint of the rear axel of the SDC may be used a reference point between the SDC and the center line of the lane for ensuring that the SDC is travelling along the center line of the lane.

Developers of the present technology have realized that a default reference path for the SDC may be represented by a plurality of anchor points (e.g., positional points in the lane) that fall on the center line of the lane and which the SDC ought to follow while operating in the lane.

Developers of the present technology have also devised an electronic device that may be configured to continuously verify whether the SDC is currently following the default reference path in the lane and whether or not the SDC is falling within constraints on the road segment. For example, the constraints on the road segment may include boundaries of the lane in which the SDC is travelling. Also, the developers of the present technology have devised an electronic device that may be configured to take action, under certain conditions, for amending the default reference path in order to fall within the constraints of the road segment and to trigger the SDC to operate in accordance with the amended path.

However, developers of the present technology have appreciated at least one technical problem associated with the prior art approaches. More specifically, they have realised that amending a given reference path may be a technically challenging task.

For example, when the lane is not straight, such as a turning lane, there is a risk that during the turning maneuver a portion of the SDC falls outside the boundaries of the turning lane. In at least some embodiments of the present technology, developers of the present technology have devised methods and systems for avoiding such unsafe situations by amending a default reference path of the SDC on the turning lane and thereby determining an amended path that the SDC ought to follow in the turning lane in order to fall within the constraints of the road segment (e.g., boundaries of the lane).

To that end, the developers have devised a system that, in some embodiments of the present technology, comprises an electronic device 800 and a plurality of sensors 814, as depicted in FIG. 8. Such system may be mounted, equipped or otherwise coupled to a given SDC. The electronic device 800, for example, may be configured to implement: a perception module 812, a lane geometry tracker 804, a bounding box modeling module 806, an optional dynamic objects tracker 808, an optional dynamic object reference history database 810, and a reference path calculation module 802. It should be noted that a given module in the context of the present specification may refer to one or more computer-implemented procedures that the electronic device is able to implement for performing processing and/or generation of data as described herein. Alternatively, the given module can be a physical electronic device. Alternatively, several modules (or all modules) can be implemented in a single electronic device.

In some non-limiting embodiments, the plurality of sensors 814 may be configured to continuously acquire data about the surroundings of the SDC, including but not limited to: data about a current lane in which the SDC is travelling, a geometry of the current lane, geometry of neighbor lanes (and data about the road segment in general on which the SDC is travelling), data about dynamic objects and their positions in the neighbor lanes, kinematic data associated with these objects, and geometric data about these objects (and data about objects in general that are in proximity to the SDC). The sensor data may be provided to the perception module 812 for further processing. In some cases, the purpose of the perception module 812 is to process and transmit data that other parts of the system may require for additional processing.

Developers of the present technology have realized that the present technology may be used, not only for determining an amended path for the SDC, but can also be used for determining a predicted path of dynamic objects in the surroundings of the SDC. In some embodiments, it is contemplated that similar methods may be employed in order to (i) determining an amended path for the SDC and (ii) determining a predicted path of dynamic objects in the surroundings of the SDC.

A first scenario in which the system is configured to determine an amended path for the SDC will now be briefly discussed. In such a scenario, the lane geometry tracker 804 may receive data, from the perception module 812, for example, about the width of the current lane in which the SDC is travelling. In other cases, this data may be acquired from an HD map of the road segment, which is either stored locally on the electronic device 800 or remotely from the electronic device 800. The lane geometry tracker 804 may determine positional data indicative of a center line of the current lane. In one embodiment of the present disclosure, the lane geometry tracker 804 may determine the positional data in a form of a polyline. Such polyline may include vertices and edges. The electronic device 800 may be configured to transform such a polyline into a continuous line via a spline interpolation procedure. In some cases, the center line of the current lane may be used by the reference path calculation module 802 for determining a default reference path of the SDC in the current lane.

In the first scenario, it is contemplated that the bounding box modelling module 806 may be configured to build a bounding box which is a simulated representation of the SDC on the road segment and which corresponds to an area covered by the SDC on the road segment.

In some non-limiting embodiments, the bounding box modelling module 806 may be configured to build a polygon that is an enlarged simulated representation of the SDC and which covers an area on the road segment that is larger than the actual area covered by the SDC on the road segment.

In other non-limiting embodiments, the bounding box corresponding to the area covered by the SDC may be built, and then, can be rotated about an axis passing through the middle of the rear axle of the SDC (+/−20 degrees, for example) which results in an enlarged polygon. This enlarged polygon is also an enlarged simulated representation of the SDC and covers an area on the road segment that is larger than the actual area covered by the SDC on the road segment.

In some cases, the bounding box modelling module 806 may be configured to transmit data to the reference path calculation module 802 for further processing. The reference path calculation module 802 may be configured to verify that the SDC is currently travelling along the default reference path and, if necessary, amend the default reference path so that the SDC falls within the constraints of the current lane in which it travels. For example, the reference path calculation module 802 may receive data about the default reference path from the lane geometry tracker 804 and about a simulated representation of the SDC from the bounding box modelling module 806, and in turn may be configured to simulate whether or not following the default reference path will result in the SDC falling outside the constraints of the current lane. In some non-limiting embodiments of the present technology, the constraints of the current lane can be implemented as lane left and right boundary (which can be marked or unmarked in a physical sense of the world, such as by lane markings).

It is contemplated that the reference path calculation module 802 may be configured to analyze the default reference path as a plurality of anchor points in the current lane. The reference path calculation module 802 may be configured to simulate movement of the SDC in the current lane as if the midpoint of the rear axle of the SDC is moved from one anchor point to next anchor point in the current lane, and may be configured to verify if any portion of the SDC, if the SDC is so-moved in the current lane, falls outside the boundaries of the current lane.

In one non-limiting embodiment of the present disclosure, instead of so-moving the simulated representation of the SDC, the reference path calculation module 802 may be configured to employ an enlarged simulated representation of the SDC, as mentioned above, and simulate movement of the enlarged simulated representation of the SDC in the current lane as if the enlarged simulated representation is moved from one anchor point to the next anchor point.

In some embodiments, the reference path calculation module 802 may be configured to determine and store leftmost and rightmost points where the bounding box falls within the current lane. Developers of the present technology have realized that this data may allow determining a safety deviation corridor in the current lane such that when the SDC is travelling within the safety deviation corridor of the current lane, the SDC will fall within constraints (e.g., boundaries) of the current lane.

In some embodiments of the present technology, the electronic device 800 may be configured to determine an amended path (or sometimes referred herein as an "amended reference path") such that the amended path falls within the safety deviation corridor. For example, the electronic device 800 may be configured to determine a polyline that passes through the safety deviation corridor. In some non-limiting embodiments, such polyline may be further processed by the electronic device 800 via an interpolation procedure or other known methods for determining a "smoothed out" amended path in the safety deviation corridor. It is contemplated that smoothing out an amended path may allow the SDC to increase the comfort of its passengers and/or to further reduce dangerous manoeuvers of the road segment.

In some cases, the electronic device may determine that there is no amended path that will allow the SDC to fall within the boundaries of the current lane. In such cases, the electronic device 800 may be configured to determine a given amended path where the reference path calculation module 802 is configured to amend the default reference path in a way that results in the SDC falling equally outside the left and the right boundaries of the current lane.

In a second scenario, the electronic device 800 may be configured to determine a predicted path for dynamic objects in the surroundings of the SDC. In some embodiments, the electronic device 800 may also trigger operation of the SDC such that its operation is adjusted in view of the predicted path of the dynamic object for avoiding a collision and for other safety purposes.

In this second scenario, the dynamic object tracker 808 may receive data, from the perception module 812, for example, in respect to detected objects moving on the neighbor lanes. This data may include inter alia a geometric size of the dynamic objects and their positions in lanes. The dynamic object tracker 808 may be configured to assign IDs to respective detected dynamic object and store the respective data about the dynamic objects in association with the respective IDs in a path history database.

Developers of the present technology have realized that by storing and analyzing data about the dynamic objects in neighboring lanes, the electronic device 800 may be configured to determine reference paths for respective dynamic objects relative to the center lines of the respective lanes where the given object is moving.

In some cases, the dynamic objects tracker may be configured to detect when the position of the dynamic object relating to the center line of the respective lane increases, and as a result, determine that the dynamic object is attempting a lane-changing maneuver. Data indicative of such determination by the dynamic object tracker 808 may be transmitted to the reference path calculation module 802.

In the second scenario, the bounding box modelling module 806 may be configured for processing the dynamic object similarly to how the bounding box modelling module 806 is configured in the first scenario for processing the data in regard to the SDC. Also, the reference path calculation module 802 may be configured in the second scenario for a respective dynamic object similarly to how the reference path calculation module 802 is configured for the SDC in the first scenario. In such a case, developers of the present technology have devised methods and systems where the reference path calculation module 802 is configured to determine amended paths that follow the assumption that the normal behaviour of dynamic objects is to follow a default reference path that falls within the boundaries of the respective lanes.

In some embodiments, when the dynamic objects tracker 808 transmits data indicative of the dynamic object attempting a lane-changing maneuver, the reference path calculation module 802 may be configured to determine a lane-changing reference path based on the historical data about the dynamic object and the center line of the respective lane.

In a first broad aspect of the present technology, there is provided a computer-implemented method of amending a reference path associated with a vehicle. The reference path is a path along a road segment that the vehicle is estimated to follow. The method is executable by an electronic device. The method comprises acquiring, by the electronic device, road segment data and reference path data. The road segment data is indicative of constraints of the road segment. The reference path data has a plurality of anchor points defining the reference path along the road segment. The method comprises using, by the electronic device, the road segment data and the reference path data to determine a safe deviation interval for each one of the plurality of anchor points. A given safe deviation interval for a given anchor point is indicative of an acceptable deviation of the vehicle from the reference path, such that if the vehicle is located within the given safe deviation interval the vehicle falls within the constraints of the road segment. The method comprises using, by the electronic device, the safe deviation intervals to determine an amended path for the vehicle instead of the reference path, such that by following the amended path the vehicle falls within the constraints of the road segment.

In some embodiments of the method, the safe deviation intervals form a safe deviation corridor for the vehicle, and where the safe deviation corridor defines a section of the road segment in which the vehicle falls within the constraints of the road segment.

In some embodiments of the method, the amended path falls within the safe deviation corridor.

In some embodiments of the method, the constraints comprise at least one of (i) physical constraints on the road segment, and (ii) road rule constraints on the road segment.

In some embodiments of the method, the electronic device is associated with a Self-Driving Car (SDC).

In some embodiments of the method, the vehicle is the SDC.

In some embodiments of the method, the method further comprises generating the reference path.

In some embodiments of the method, the SDC is different from the vehicle, and where the method further comprises generating the reference path by accessing a database of historical maneuvers associated with the vehicle and generating a prediction of the reference path.

In some embodiments of the method, the method further comprises generating, by the electronic device, operation-control data for controlling operation of the SDC. The operation-control data represents computer commands for the SDC to follow the amended path along the road segment.

In some embodiments of the method, the SDC is located in proximity to the vehicle on the road segment.

In some embodiments of the method, the method further comprises using, by the electronic device, the amended path of the vehicle for modifying a current path of the SDC along the road segment.

In some embodiments of the method, the using the road segment data and the reference path data to determine safe deviation intervals further comprises: (i) generating, by the electronic device, a simulated representation of the vehicle for a respective anchor point from the plurality of anchor points on a simulated representation of the road segment, and (ii) determining, by the electronic device, the safe deviation intervals of the respective anchor points form the plurality of anchor points based on the respective simulated representation of the vehicle on the simulated representation of the road segment.

In some embodiments of the method, the simulated representation of the vehicle covers an artificially increased surface on the simulated representation of the road segment. The artificially increased surface is larger than an actual surface that the vehicle covers of the road segment.

In some embodiments of the method, the simulated representation of the vehicle covers an actual surface on the simulated representation of the road segment, and where the method further comprises as part of the determining the safe deviation intervals of the respective anchor points rotating the simulated presentation using a pre-determined angle to generate an enlarged projection of the vehicle onto the road segment.

In some embodiments of the method, the using the safe deviation intervals to determine the amended path comprises: (i) determining, by the electronic device, amended anchor points for the respective safe deviation intervals, such that a given amended anchor point falls within the respective safe deviation interval, and (ii) determining, by the electronic device the amended path as being a sequence of the amended anchor points.

In some embodiments of the method, the given amended anchor point corresponds to a midpoint of the respective safe interval.

In some embodiments of the method, the sequence of the amended anchor points comprises a poly-line.

In some embodiments of the method, comprising defining the plurality of anchor points.

In some embodiments of the method, the defining is based on at least a velocity of the vehicle.

In a second broad aspect of the present technology, there is provided an electronic device for amending a reference path associated with a vehicle. The reference path is a path along a road segment that the vehicle is estimated to follow. The electronic device is configured to acquire road segment data and reference path data. The road segment data is indicative of constraints of the road segment. The reference path data has a plurality of anchor points defining the reference path along the road segment. The electronic device is configured to use the road segment data and the reference path data to determine a safe deviation interval for each one of the plurality of anchor points. A given safe deviation interval for a given anchor point is indicative of an acceptable deviation of the vehicle from the reference path, such that if the vehicle is located within the given safe deviation interval the vehicle falls within the constraints of the road segment. The electronic device is configured to use the safe deviation intervals to determine an amended path for the vehicle instead of the reference path, such that by following the amended path the vehicle falls within the constraints of the road segment.

In some embodiments of the electronic device, the safe deviation intervals form a safe deviation corridor for the vehicle, and where the safe deviation corridor defines a section of the road segment in which the vehicle falls within the constraints of the road segment.

In some embodiments of the electronic device, the amended path falls within the safe deviation corridor.

In some embodiments of the electronic device, the constraints comprise at least one of (i) physical constraints on the road segment, and (ii) road rule constraints on the road segment.

In some embodiments of the electronic device, the electronic device is associated with a Self-Driving Car (SDC).

In some embodiments of the electronic device, the vehicle is the SDC.

In some embodiments of the electronic device, the method further comprises generating the reference path.

In some embodiments of the electronic device, the SDC is different from the vehicle, and wherein the method further comprises generating the reference path by accessing a database of historical maneuvers associated with the vehicle and generating a prediction of the reference path.

In some embodiments of the electronic device, the method further comprises generating, by the electronic device, operation-control data for controlling operation of the SDC, and where the operation-control data representing computer commands for the SDC to follow the amended path along the road segment.

In some embodiments of the electronic device, the SDC is located in proximity to the vehicle on the road segment.

In some embodiments of the electronic device, the method further comprises using, by the electronic device, the amended path of the vehicle for modifying a current path of the SDC along the road segment.

In some embodiments of the electronic device, the using the road segment data and the reference path data to determine safe deviation intervals further comprises: (i) generating, by the electronic device, a simulated representation of the vehicle for a respective anchor point from the plurality of anchor points on a simulated representation of the road segment, and (ii) determining, by the electronic device, the safe deviation intervals of the respective anchor points form the plurality of anchor points based on the respective simulated representation of the vehicle on the simulated representation of the road segment.

In some embodiments of the electronic device, the simulated representation of the vehicle covers an artificially increased surface on the simulated representation of the road segment, and where the artificially increased surface is larger than an actual surface that the vehicle covers of the road segment.

In some embodiments of the electronic device, the simulated representation of the vehicle covers an actual surface on the simulated representation of the road segment, and wherein the method further comprises as part of the determining the safe deviation intervals of the respective anchor points rotating the simulated presentation using a pre-determined angle to generate an enlarged projection of the vehicle onto the road segment.

In some embodiments of the electronic device, the using the safe deviation intervals to determine the amended path comprises: (i) determining, by the electronic device, amended anchor points for the respective safe deviation intervals, such that a given amended anchor point falls within the respective safe deviation interval, and (ii) determining, by the electronic device the amended path as being a sequence of the amended anchor points.

In some embodiments of the electronic device, the given amended anchor point corresponds to a midpoint of the respective safe interval.

In some embodiments of the electronic device, the sequence of the amended anchor points comprises a polyline.

In some embodiments of the electronic device, the electronic device is further configured to define the plurality of anchor points.

In some embodiments of the electronic device, the electronic device defines the plurality of anchor points based on at least a velocity of the vehicle.

In the context of the present specification, a "server" is a computer program that is running on appropriate hardware and is capable of receiving requests (e.g. from client devices) over a network, and carrying out those requests, or causing those requests to be carried out. The hardware may be implemented as one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. In the context of the present specification, the term "electronic device" implies that a device can function as a server for other electronic devices and client devices, however it is not required to be the case with respect to the present technology. Thus, some (non-limiting) examples of electronic devices include personal computers (desktops, laptops, netbooks, etc.), smart phones, and tablets, as well as network equipment such as routers, switches, and gateways. It should be understood that in the present context the fact that the device functions as an electronic device does not mean that it cannot function as a server for other electronic devices. The use of the expression "an electronic device" does not preclude multiple client devices being used in receiving/sending, carrying out or causing to be carried out any task or request, or the consequences of any task or request, or steps of any method described herein.

In the context of the present specification, "client device" is any computer hardware that is capable of running software appropriate to the relevant task at hand. In the context of the present specification, in general the term "client device" is associated with a user of the client device. Thus, some (non-limiting) examples of client devices include personal computers (desktops, laptops, netbooks, etc.), smart phones, and tablets, as well as network equipment such as routers, switches, and gateways It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "software component" is meant to include software (appropriate to a particular hardware context) that is both necessary and sufficient to achieve the specific function(s) being referenced.

In the context of the present specification, the expression "computer information storage media" (also referred to as "storage media") is intended to include media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first database" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware components, in other cases they may be different software and/or hardware components.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

DETAILED DESCRIPTION

Figure 1:
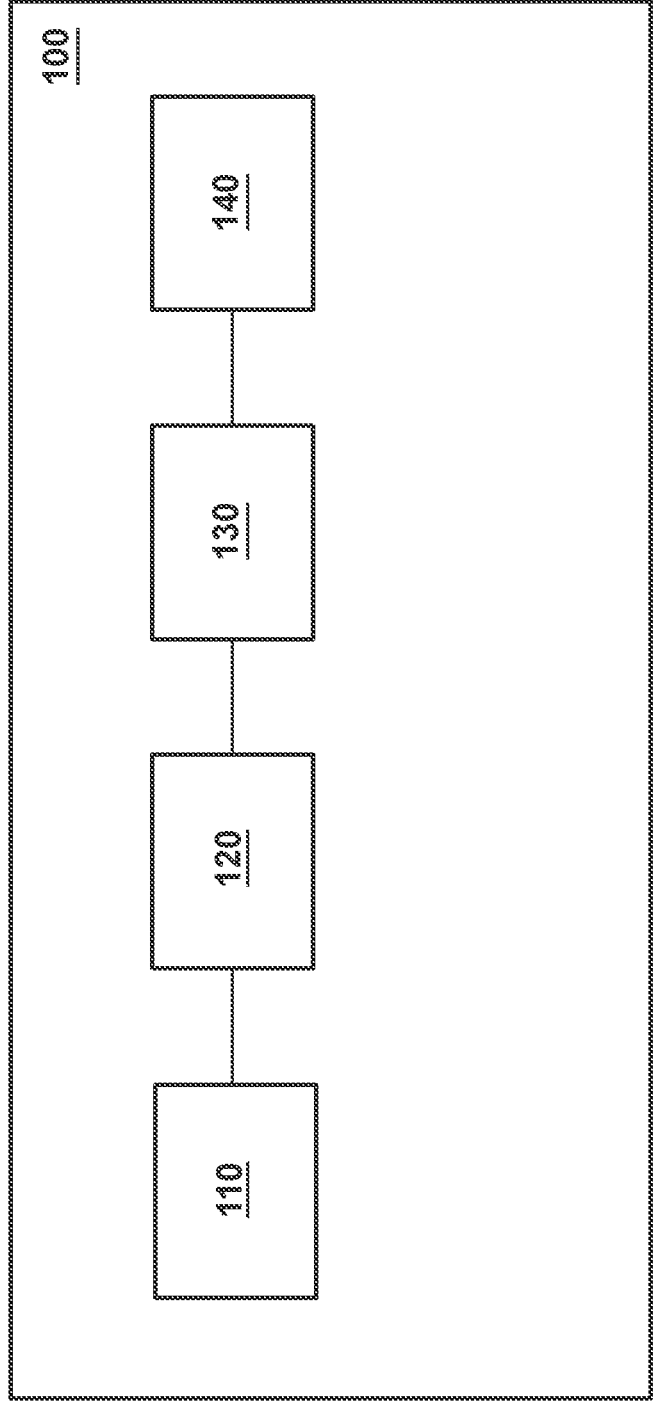
FIG. 1 depicts a schematic diagram of an example computer system for implementing certain embodiments of systems and/or methods of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology.

Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labelled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared.

Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Computer System

Referring initially to FIG. 1, there is depicted a computer system 100 suitable for use with some implementations of the present technology, the computer system 100 comprising various hardware components including one or more single or multi-core processors collectively represented by processor 110, a solid-state drive 120, a memory 130, which may be a random-access memory or any other type of memory. Communication between the various components of the computer system 100 may be enabled by one or more internal and/or external buses (not shown) (e.g. a PCI bus, universal serial bus, IEEE 1394 "Firewire" bus, SCSI bus, Serial-ATA bus, etc.), to which the various hardware components are electronically coupled.

In at least some embodiments of the present technology, the solid-state drive 120 stores program instructions suitable for being loaded into the memory 130 and executed by the processor 110 for determining a presence of an object. For example, the program instructions may be part of a vehicle control application executable by the processor 110.

In at least some embodiments of the present technology, it is contemplated that the computer system 100 may have additional and/or optional components, such as a network communication module 140 for communication, via a communication network (for example, a communication network 240 depicted in FIG. 2) with other electronic devices and/or servers, localization modules (not depicted), and the like.

Networked Computer Environment

Figure 2:
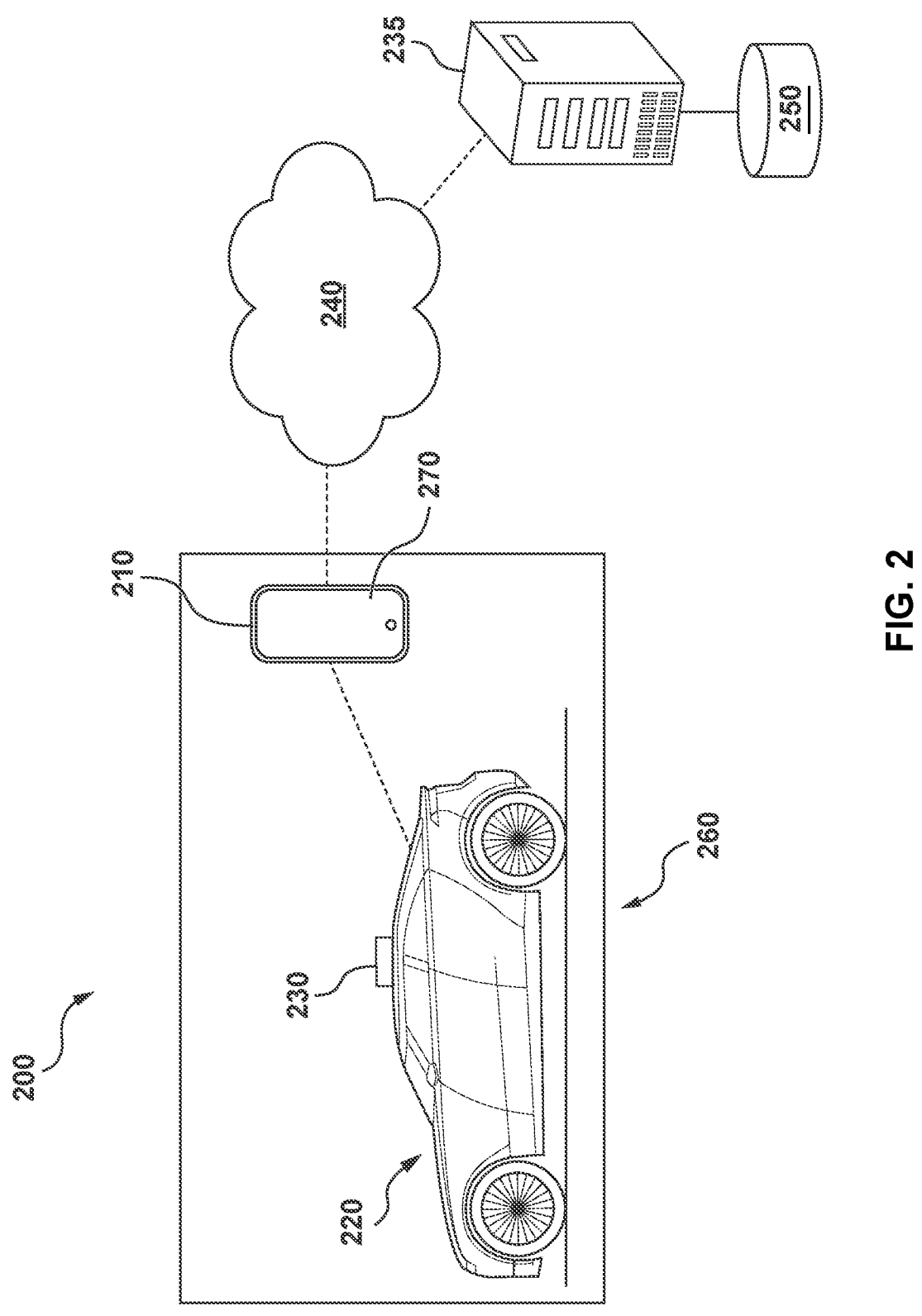
FIG. 2 depicts a networked computing environment suitable for use with some implementations of the present technology.

FIG. 2 illustrates a networked computer environment 200 suitable for use with some embodiments of the systems and/or methods of the present technology. The networked computer environment 200 comprises an electronic device 210 associated with a vehicle 220, or associated with a user (not depicted) who can operate the vehicle 220, a server 235 in communication with the electronic device 210 via the communication network 240 (e.g. the Internet or the like, as will be described in greater detail herein below). Optionally, the networked computer environment 200 can also include a GPS satellite (not depicted) transmitting and/or receiving a GPS signal to/from the electronic device 210. It will be understood that the present technology is not limited to GPS and may employ a positioning technology other than GPS. It should be noted that the GPS satellite can be omitted altogether.

The vehicle 220, with which the electronic device 210 is associated, may comprise any leisure or transportation vehicle such as a private or commercial car, truck, motorbike or the like. The vehicle may be user operated or a driver-less vehicle. It should be noted that specific parameters of the vehicle 220 are not limiting, these specific parameters including: vehicle manufacturer, vehicle model, vehicle year of manufacture, vehicle weight, vehicle dimensions, vehicle weight distribution, vehicle surface area, vehicle height, drive train type (e.g. 2× or 4×), tyre type, brake system, fuel system, mileage, vehicle identification number, and engine size.

The implementation of the electronic device 210 is not particularly limited, but as an example, the electronic device 210 may be implemented as a vehicle engine control unit, a vehicle CPU, a vehicle navigation device (e.g. TomTom™, Garmin™), a tablet, and a personal computer built into the vehicle 220 and the like. Thus, it should be noted that the electronic device 210 may or may not be permanently associated with the vehicle 220. Additionally or alternatively, the electronic device 210 can be implemented in a wireless communication device such as a mobile telephone (e.g. a smart-phone or a radio-phone). In certain embodiments, the electronic device 210 has a display 270.

The electronic device 210 may comprise some or all of the components of the computer system 100 depicted in FIG. 1. In certain embodiments, the electronic device 210 is on-board computer device and comprises the processor 110, solid-state drive 120 and the memory 130. In other words, the electronic device 210 comprises hardware and/or software and/or firmware, or a combination thereof, for determining a trajectory of the vehicle 220 at a given road segment considering obstacles therein, as will be described in greater detail below.

Sensor System

In the non-limiting embodiments of the present technology, the electronic device 210 comprises or has access to a sensor system 230. According to these embodiments, the sensor system 230 may comprise a plurality of sensors allowing for various implementations of the present technology. Examples of the plurality of sensors include but are not limited to: cameras, LIDAR sensors, and RADAR sensors, etc. The sensor system 230 is operatively coupled to the processor 110 for transmitting the so-captured information to the processor 110 for processing thereof, as will be described in greater detail herein below.

The sensor system 230 can be mounted on an interior, upper portion of a windshield of the vehicle 220, but other locations are within the scope of the present disclosure, including on a back window, side windows, front hood, rooftop, front grill, or front bumper of the vehicle 220. In some non-limiting embodiments of the present technology, the sensor system 230 can be mounted in a dedicated enclosure (not depicted) mounted on the top of the vehicle 220.

Further, the spatial placement of the sensor system 230 can be designed taking into account the specific technical configuration thereof, configuration of the enclosure, weather conditions of the area where the vehicle 220 is to be used (such as frequent rain, snow, and other elements) or the like.

In the non-limiting embodiments of the present technology, the sensor system 230 may comprise a sensor configured to capture an image of a surrounding area 260. In this regard the sensor system 230 may be a camera or a plurality thereof (not separately depicted).

How the camera is implemented is not particularly limited. For example, in one specific non-limiting embodiments of the present technology, the camera can be implemented as a mono camera with resolution sufficient to detect objects at pre-determined distances of up to about 30 m (although cameras with other resolutions and ranges are within the scope of the present disclosure).

In some embodiments of the present technology, the camera (or one or more cameras that make up the implementation of the sensor system 230) is configured to capture a pre-determined portion of the surrounding area 260 around the vehicle 220. In some embodiments of the present technology, the camera is configured to capture an image (or a series of images) that represent approximately 90 degrees of the surrounding area 260 around the vehicle 220 that are along a movement path of the vehicle 220.

In other embodiments of the present technology, the camera is configured to capture an image (or a series of images) that represent approximately 180 degrees of the surrounding area 260 around the vehicle 220 that are along a movement path of the vehicle 220. In yet additional embodiments of the present technology, the camera is configured to capture an image (or a series of images) that represent approximately 360 degrees of the surrounding area 260 around the vehicle 220 that are along a movement path of the vehicle 220 (in other words, the entirety of the surrounding area around the vehicle 220).

In a specific non-limiting example, the camera can be of the type available from FLIR Integrated Imaging Solutions Inc., 12051 Riverside Way, Richmond, BC, V6 W 1K7, Canada. It should be expressly understood that the camera can be implemented in any other suitable equipment.

In the non-limiting embodiments of the present technology, the sensor system 230 may further comprise a LIDAR instrument (not separately depicted). Lidar stands for LIght Detection and Ranging. It is expected that a person skilled in the art will understand the functionality of the LIDAR instrument, but briefly speaking, a transmitter (not depicted) of the LIDAR sends out a laser pulse and the light particles (photons) are scattered back to a receiver (not depicted) of the LIDAR instrument. The photons that come back to the receiver are collected with a telescope and counted as a function of time. Using the speed of light ($\sim$3×10$^8$ m/s), the processor 110 can then calculate how far the photons have travelled (in the round trip). Photons can be scattered back off of many different entities surrounding the vehicle 220, such as other particles (aerosols or molecules) in the atmosphere, other cars, stationary objects or potential obstructions in front of the vehicle 220.

In a specific non-limiting example, the LIDAR instrument comprised in the sensor system 230 can be implemented as the LIDAR based sensor that may be of the type available from Velodyne LiDAR, Inc. of 5521 Hellyer Avenue, San Jose, CA 95138, United States of America. It should be expressly understood that the LIDAR instrument can be implemented in any other suitable equipment.

In some embodiments of the present technology, the LIDAR instrument comprised in the sensor system 230 can be implemented as a plurality of LIDAR based sensors, such as three, for example, or any other suitable number.

In the non-limiting embodiments of the present technology, the sensor system 230 may further comprise a RAdio Detection And Ranging (RADAR) instrument (not separately depicted). Briefly speaking, the RADAR instrument is a detection instrument using radio waves to determine a range, angle and/or velocity of objects. The RADAR instrument includes a transmitter producing electromagnetic waves, an antenna used for transmitting and receiving electromagnetic waves, a receiver, and a processor to determine properties of the detected objects.

In alternative embodiments of the present technology, there may be a separate antenna for receiving waves, and a separate antenna for transmitting waves. The processor used for determining properties of surrounding objects may be the processor 110.

In some embodiments of the present technology, the RADAR instrument used in the sensor system 230 may comprise long-range, medium-range and short-range RADAR sensors. As a non-limiting example, the long-range RADAR sensor may be used for adaptive cruise control, automatic emergency braking, and forward collision warning, while the medium and short-range RADAR sensors may be used for park assist, cross-traffic alert, junction assist, and blind side detection.

In a specific non-limiting example, the RADAR instrument comprised in the sensor system 230 may be of the type available from Robert Bosch GmbH of Robert-Bosch-Platz 1, 70839 Gerlingen, Germany. It should be expressly understood that the RADAR instrument can be implemented in any other suitable equipment.

In some non-limiting embodiments of the present technology, the sensor system 230 may be used, by the processor 110, for image calibration. For example, using an image captured by the camera and the LIDAR point cloud captured by the LIDAR instrument, the processor 110 is configured to identify a given region of the image to correspond to a given region of the LIDAR point cloud captured by the LIDAR instrument. In other embodiments of the present technology, the sensor system 230 are calibrated such that for the image captured by the camera, the LIDAR point cloud captured by the LIDAR instrument, and the RADAR data captured by the RADAR instrument, the processor 110 is configured to identify a given region of the image to correspond to a given region of the LIDAR point cloud and the RADAR data.

In the non-limiting embodiments of the present technology, the vehicle 220 further comprises or has access to other sensors (not separately depicted). The other sensors include one or more of: an inertial measurement unit (IMU), a Global Navigation Satellite System (GNSS) instrument, ground speed RADARs, ultrasonic SONAR sensors, odometry sensors including accelerometers and gyroscopes, mechanical tilt sensors, magnetic compass, and other sensors allowing operation of the vehicle 220.

As a non-limiting example, the IMU may be fixed to the vehicle 220 and comprise three gyroscopes and three accelerometers for providing data on the rotational motion and linear motion of the vehicle 220, which may be used to calculate motion and position of the vehicle 220.

Communication Network

In some embodiments of the present technology, the communication network 240 is the Internet. In alternative non-limiting embodiments, the communication network 240 can be implemented as any suitable local area network (LAN), wide area network (WAN), a private communication network or the like. It should be expressly understood that implementations of the communication network 240 are for illustration purposes only. How a communication link (not separately numbered) between the electronic device 210 and the communication network 240 is implemented will depend inter alia on how the electronic device 210 is implemented. Merely as an example and not as a limitation, in those non-limiting embodiments of the present technology where the electronic device 210 is implemented as a wireless communication device such as a smartphone or a navigation device, the communication link can be implemented as a wireless communication link. Examples of wireless communication links include, but are not limited to, a 3G communication network link, a 4G communication network link, and the like. The communication network 240 may also use a wireless connection with a server 235.

Server

In some embodiments of the present technology, the server 235 is implemented as a conventional computer server and may comprise some or all of the components of the computer system 100 of FIG. 1. In one non-limiting example, the server 235 is implemented as a Dell™ PowerEdge™ Server running the Microsoft™ Windows Server™ operating system, but can also be implemented in any other suitable hardware, software, and/or firmware, or a combination thereof. In the depicted non-limiting embodiments of the present technology, the server is a single server. In alternative non-limiting embodiments of the present technology (not shown), the functionality of the server 235 may be distributed and may be implemented via multiple servers.

In some non-limiting embodiments of the present technology, the processor 110 of the electronic device 210 can be in communication with the server 235 to receive one or more updates. The updates can be, but are not limited to, software updates, map updates, routes updates, weather updates, and the like.

In some embodiments of the present technology, the processor 110 can also be configured to transmit to the server 235 certain operational data, such as routes travelled, traffic data, performance data, and the like. Some or all data transmitted between the vehicle 220 and the server 235 may be encrypted and/or anonymized.

Storage

In FIG. 2, there is also depicted a storage 250 communicatively coupled to the server 235. In some embodiments, however, the storage 250 may be communicatively coupled to the electronic device 210 and/or may be implemented within the electronic device 210 and/or may be communicatively coupled to any other processor of the networked computer environment 200.

In at least some embodiments, it is contemplated that the storage 250 may be used by the server 235, the electronic device 210 and/or any other processor of the networked computer environment 200 as a memory device for storing information. The storage 250 is configured to store information extracted, determined and/or generated by the processor 110 of the server 235 and/or the electronic device 210. Generally speaking, the storage 250 may receive data from the processor 110 which was generated by the processor 110 during processing for temporary and/or permanent storage thereof and may provide stored data to the processor 110 for use thereof. It is contemplated that the storage 250 may be split into several distributed storages, for providing a fault-tolerant storage system for example, without departing from the scope of the present technology.

It should be noted that in at least some embodiments of the present technology, the storage 250 may be implemented locally on the electronic device 210 and/or the server 235 (such as on a local memory, for example). It is also contemplated however that the storage 250 may be implemented remotely from the electronic device 210 and/or the server 235 (such as on a remote memory, for example).

Electronic Device

Figure 8:
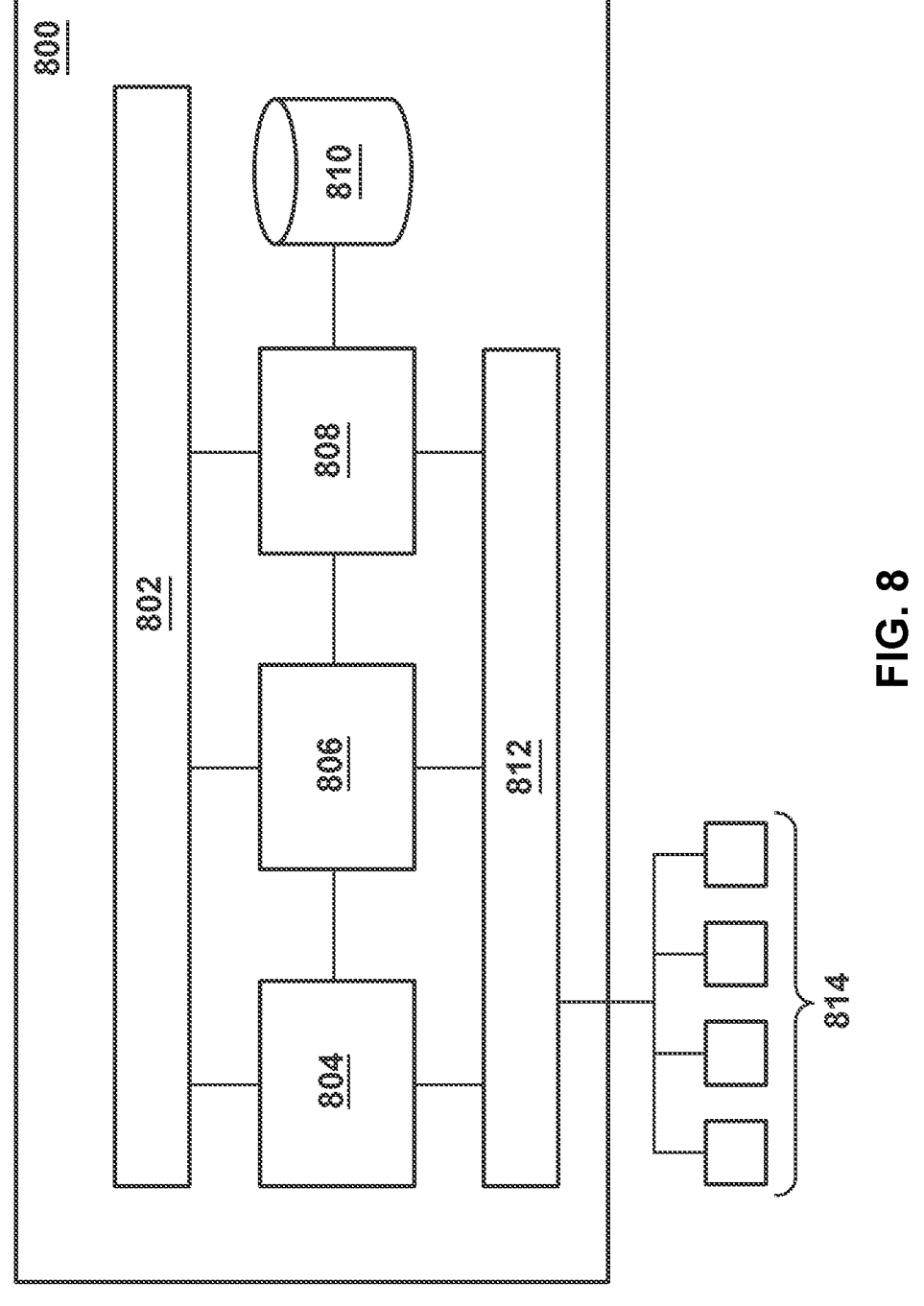
FIG. 8 depicts an electronic device that is used in the networked computing environment of FIG. 2 in at least some implementations of the present technology.

Broadly speaking, the electronic device 210 may be configured to control operation or otherwise trigger control of the operation of the vehicle 220. In some embodiments of the present technology, the electronic device 210 may be implemented in a similar manner to how the electronic device 800 of FIG. 8 is implemented.

More specifically, the electronic device 210 may be configured to control operation or otherwise trigger control of the operation of the vehicle 220 when approaching a turn and/or when the vehicle 220 is about to perform a turning manoeuver.

Figure 3:
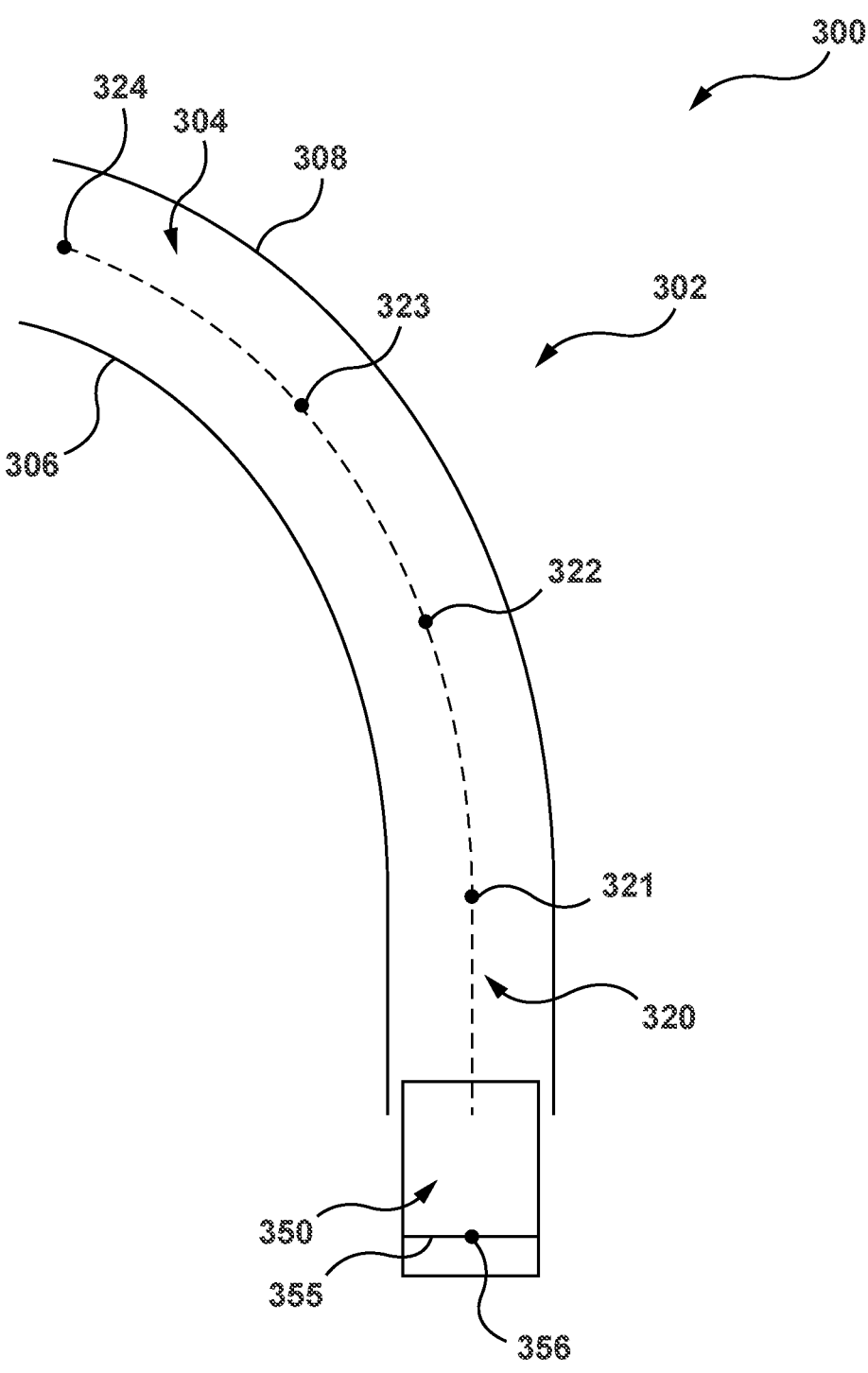
FIG. 3 depicts a simulated representation of a road segment, of a vehicle from the networked computing environment of FIG. 2 and a reference path for the vehicle through the road segment, in accordance with at least some embodiments of the present technology.

In one example, the electronic device 210 may be configured to determine operation-control data for controlling operation of the vehicle 220 when the vehicle 220 is approaching a given turn on a road segment. In another example, the electronic device 210 may also be configured to determine operation-control data for controlling operation of the vehicle 220 when the vehicle 220 is performing a turning manoeuver. To better illustrate this, reference will now be made to FIG. 3 depicted a birds-eye view representation 300 of the vehicle 220 approaching a turn.

It is contemplated that in at least one non-limiting embodiment of the present technology, the electronic device 210 may be configured to simulate and render the birds-eye view representation 300 on the display 270 for example. However in other non-limiting embodiments of the present technology, the birds-eye view representation 300 is generated for processing purposes only, without any displaying thereof.

The electronic device 210 may be configured to acquire road segment data for generating a simulated representation of a road segment 302. Broadly speaking, the road segment data acquired by the electronic device 210 is indicative of constraints of the road segment 302 on which the vehicle 220 is travelling.

It should be noted that the constraints of the road segment 302 may take many forms and, as such, may comprise at least one of (i) physical constraints on the road segment, and (ii) road rule constraints on the road segment 302.

Broadly speaking, physical constraints of the road segment 302 may include one or more parameters that define geometry of the road segment 302. For example, the physical constraints of the road segment 302 may include one or more radii of the road segment 302 (e.g., that can be used to parametrized the turn associated with the road segment 302), one or more distances (such as widths and/or lengths, for example) associated with portions of the road segment 302, one or more positions (such as positions of various objects and/or boundaries, for example) associated with the road segment 302, one or more angles associated with the road segment 302, and the like. In some non-limiting embodiments of the present technology, it is contemplated that data indicative of the physical constraints may be acquired by the electronic device 210 from the sensor system 230, as explained above.

Broadly speaking, road rule constraints of the road segment 302 may include one or more road rules that regulate traffic on the road segment 302. For example, the road rule constraints may include road signs, one or more lane lines, and the like. In some non-limiting embodiments of the present technology, it is contemplated that data indicative of the road rule constraints may be acquired by the electronic device 210 from the sensor system 230 and/or from the server 235, as explained above.

In some cases, the electronic device 210 may employ data indicative of the road rule constraints and data indicative of the physical constraints in a complementary manner during data processing. For example, data indicative of physical lane boundaries and data indicative of that those lane boundaries are provided for regulating traffic in the lane (so as to avoid collisions, for example) may be employed by the electronic device 210 such that the electronic device 210 has access to information regarding (i) a position of a given lane boundary on the road segment 302, and (ii) that it is prohibited to cross over the given lane boundary when travelling in that lane.

It is contemplated that the electronic device 210 may be configured to generate the simulated representation of the road segment 302 as depicted in FIG. 3 based on the data indicative of constraints of the road segment 302. As appreciated from the illustration of FIG. 3, the road segment 302 has a lane 304, which is defined by a left boundary 306 and a right boundary 308. In this case, it can be said that the left boundary 306 and the right boundary 308 of the lane 304 are part of the constraints of the road segment 302 and allow regulating traffic on the road segment 302.

Also depicted in FIG. 3 is a bounding box 350 that is a simulated representation of the vehicle 220. It should be noted that the electronic device 210 may be configured to generate the bounding box 350 based on data associated with the vehicle 220, such as data indicative of geometry, configuration, and size of the vehicle 220.

For example, the bounding box 350 depicted in FIG. 3 occupies a substantially same area on the simulated representation of the road segment 302 as the surface area occupied by the vehicle 220 on the road segment 302. In the same example, the electronic device 210 may be configured to generate a simulated representation of a rear axle 355 of the vehicle 220 within the bounding box 350 and a simulated representation of an axis 356 passing through a midpoint of the rear axle 355 of the vehicle 220. It should be noted that the axis 356 extends upwardly and perpendicular to the ground surface upon which the vehicle 220 is travelling.

Hence, it can be said that the electronic device 210 may be configured to generate the simulated representation of the vehicle 220 by generating the bounding box 350, the rear axle 355 and the axis 356 based on data associated with the vehicle 220. It should be noted that in some embodiments of the present technology, the electronic device 210 may be configured to employ (i) a simulated representation of a front axle with, or instead of, the simulated representation of the rear axle 355, (ii) a simulated representation of an axis of the front axle, with or instead of, the simulated representation of the axis 356 in the context of the present technology and depending on inter alia the geometry, the configuration (e.g., front wheel drive, rear wheel drive, 4×4) and size of the vehicle 220.

In some embodiments, the electronic device 210 may be configured to implement a bounding box modelling module. For example, the bounding box modelling module may be configured to generate the bounding box 350 as described above. In another example, the bounding box modelling module may also be configured to generate a given bounding box for neighbouring vehicles of the vehicle 220 in a similar manner to how the bounding box modelling module is configured to generate the bounding box 350.

In some non-limiting embodiments of the present technology, it is contemplated that the electronic device 210 may be configured to acquire reference path data that is indicative of a reference path 320. It should be noted that the reference path 320 is a path along the road segment 302 that the vehicle 220 is estimated to follow.

In some cases, the reference path data may be acquired by the electronic device 210 from the server 235, for example. In other cases, the electronic device 210 may be configured to acquire the reference path data by generating the reference path 320.

For example, the electronic device 210 may be configured to generate the reference path 320 by defining a plurality of anchor points (not numbered) along the road segment 302.

As illustrated, the plurality of anchor points includes a first anchor point 321, a second anchor point 322, a third anchor point 323, and a fourth anchor point 324 along the road segment 302.

In some embodiments, the electronic device 210 may be configured to define anchor points of a given reference path as geometric points along a centre line of a lane in which the vehicle 220 is currently travelling. For example, the electronic device 210 may be configured to determine the first anchor point 321, the second anchor point 322, the third anchor point 323, and the fourth anchor point 324 as a plurality of geometric points along the centre line of the lane 304.

It is contemplated that the electronic device 210 may be configured to determine the centre line of the lane 304 by identifying the centre line as being a midline between the left boundary 306 and the right boundary 308 (e.g., based on the physical constraints of the road segment 302) and then may be configured to determine the plurality of anchor points along that midline.

It should be noted that the reference path 320 may sometimes be referred as a "default" reference path of the vehicle 220, since, it is assumed that in normal conditions the vehicle 220 is ought to travel along the centre line of a given lane by default. Indeed, developers of the present technology have realized that in normal conditions, such as for example when the vehicle 220 is travelling along a straight lane, the vehicle 220 ought to be travelling along the centre line of that lane for safety purposes. Put another way, it is assumed that in normal conditions the vehicle 220 ought to be travelling along a current lane such that the axis 356 is aligned with the centre line of the current lane.

It should be noted that the electronic device 210 may be configured to determine the plurality of anchor points with different distances between the respective anchor points. It is contemplated that distances between the respective anchor points may be pre-selected by the electronic device 210 in different manners for a given application.

In some embodiments of the present technology, the electronic device 210 may implement a lane geometry tracking module, or a lane geometry tracker. It is contemplated that the lane geometry tracker of the electronic device 210 may be configured to receive data about the lane 304 and determine based on that data the centre line of the lane 304. In some cases, the centre line of the lane 304 may be calculated by the lane geometry tracker in a form of a polyline having a plurality of vertices. It is contemplated that the plurality of vertices may be used as the plurality of anchor points of a respective default reference path.

However, developers of the present technology have also realized that travelling along the centre line of a given lane is not always a best and/or safest option for the vehicle 220. For example, and as illustrated in FIG. 3, some lanes such as the lane 304 are not straight, but are rather turning lanes and may include a curve (an angle of which depends on the specific road geometry, of course). In such cases where the vehicle 220 is to travel on the road segment 302 having turning lane 304, if the electronic device 210 is configured to trigger the vehicle 220 to travel along the reference path 320, at least parts of the vehicle 220 may cross over the left boundary 306 and/or the right boundary 308 (e.g., fall outside the constraints of the road segment 302). The vehicle 220 at least partially crossing over boundaries of the lane 304 is against the road rules and may be unsafe for passengers and/or other vehicles travelling in the proximity of the vehicle 220.

It should be noted that in the scenario depicted in FIG. 3, it is assumed that at least parts of the vehicle 220 will cross over the left boundary 306 if the vehicle 220 follows the reference path 320. However, as explained above, depending on the geometry, configuration, and/or size of the vehicle 220, at least parts of the vehicle 220 may, alternatively or in addition to crossing the left boundary 306, cross over the right boundary 308 during a left turn. Such a situation may occur when the vehicle 220 is implemented as a school bus, for example, where a rear of the vehicle 220 extends more rearwardly from the rear axle of the vehicle 220 than what is depicted in the scenario of FIG. 3.

For at least those reasons, the developers of the present technology have devised methods and systems that allow amending a given reference path associated with the vehicle 220 and thereby generating a given amended path that allows the vehicle 220 to fall within the boundaries of a given turning lane.

As it will become apparent from the description herein further below, the electronic device 210 may be configured to determine a safe deviation corridor 550 (see FIG. 5) in the lane 304 which defines a section of the lane 304 (e.g., of the road segment 302) in which the vehicle 220 falls within the constraints of the road segment 302 if the vehicle 220 travels in the safe deviation corridor 550. Put another way, it can be said that the electronic device 210 may be further configured to generate an amended path 620 (see FIG. 6) that is within the safe deviation corridor 550 such that if the vehicle 220 travels along the amended path 620 (e.g., the axis 356 of the vehicle 220 is aligned with the amended path 620), the vehicle 220 will fall within the constraints of the road segment 302 (e.g., will not cross over the left boundary 306 or the right boundary 308).

How the electronic device 210 is configured to determine the safe deviation corridor 550 and the amended path 620 will now be described in turn.

During the generating process of the safe deviation corridor 550, the electronic device 210 may be configured to perform an anchor-by-anchor verification procedure to determine whether or not the vehicle 220 may safely deviate from a respective anchor point of the reference path 320. In other words, the electronic device 210 may be configured to determine for each anchor point of the reference path 320 a respective safety deviation interval that is indicative of an acceptable deviation of the vehicle 220 from the reference path 320 such that if the vehicle 220 is located within the given safe deviation interval, the vehicle 220 falls within the constraints of the road segment 302.

Figure 4:
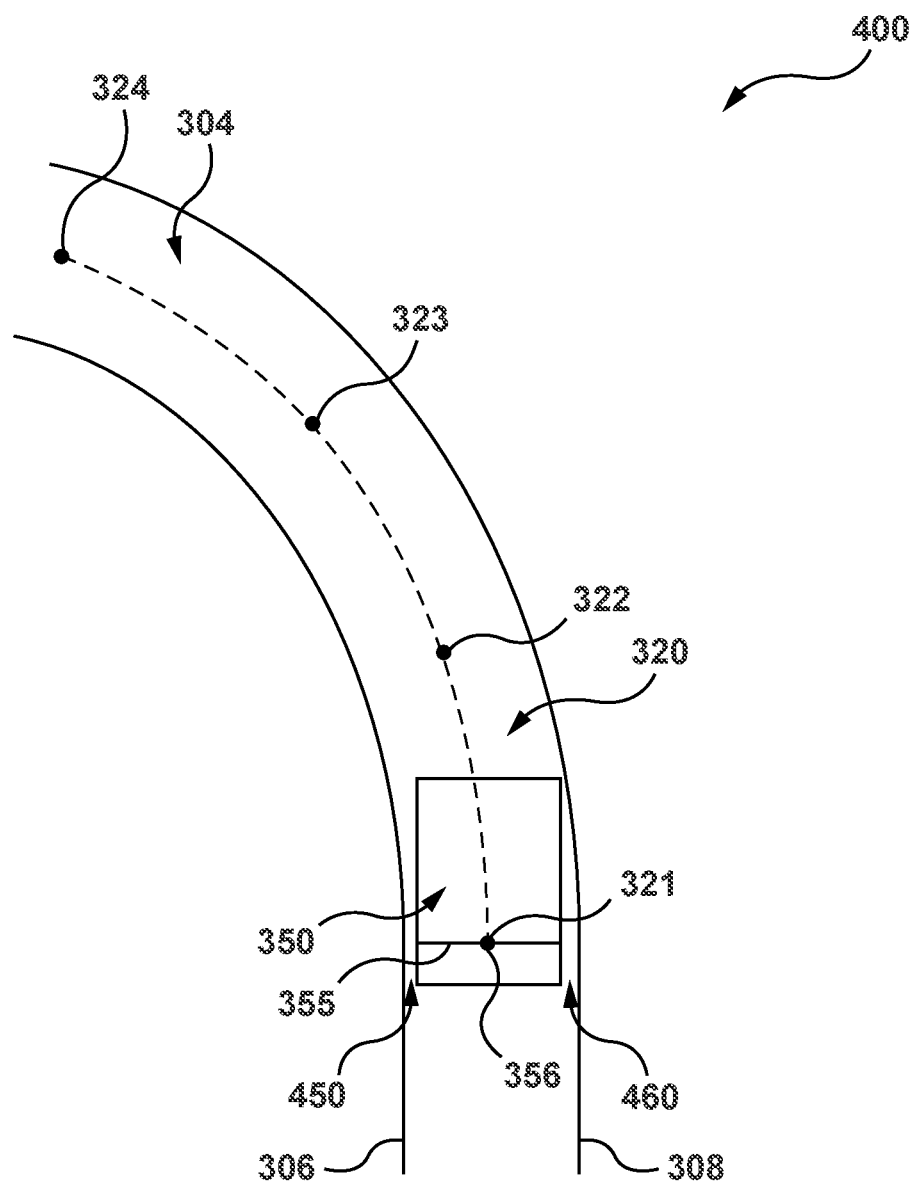
FIG. 4 depicts a verification procedure performed by the electronic device of the networked computing environment of FIG. 2 for a first anchor point of the reference path of FIG. 3, in accordance with at least some embodiments of the present technology.

With reference to FIG. 4, there is depicted a representation 400 of the electronic device 210 performing the verification procedure for the first anchor point 321. To that end, as seen in FIG. 4, the electronic device 210 may be configured to simulate a situation where the bounding box 350 is located on the road segment 302 such that the axis 356 is aligned with the first anchor point 321. As a result, the electronic device 210 may be configured to determine a pair of safe deviation distances for the first anchor point 321, including a safe deviation distance 450 and a safe deviation distance 460.

It should be noted that the safe deviation distance 450 is a shortest distance between any point of the left boundary 306 and any point of the bounding box 350 when the bounding box 350 is positioned such that the axis 356 is aligned with the first anchor point 321 and that the forward direction of travel is tangent to the reference path 320 at the first anchor point 321. Also, the safe deviation distance 460 is a shortest distance between any point of the right boundary 308 and any point of the bounding box 350 when the bounding box 350 is positioned such that the axis 356 is aligned with the first anchor point 321 that the forward direction of travel is tangent to the reference path 320 at the first anchor point 321. Hence, it can be said that the bounding box 350 may be deviated by the safe deviation distance 450 to the left and/or by the safe deviation distance 460 to the right while still falling within the constraints of the road segment 302.

It should be noted that the electronic device 210, may be configured to determine a pair of safe deviation distances for each anchor point of the reference path 320 similarly to how the electronic device 210 is configured to determine the pair of safe deviation distances 450 and 460 for the first anchor point 321.

Figure 5:
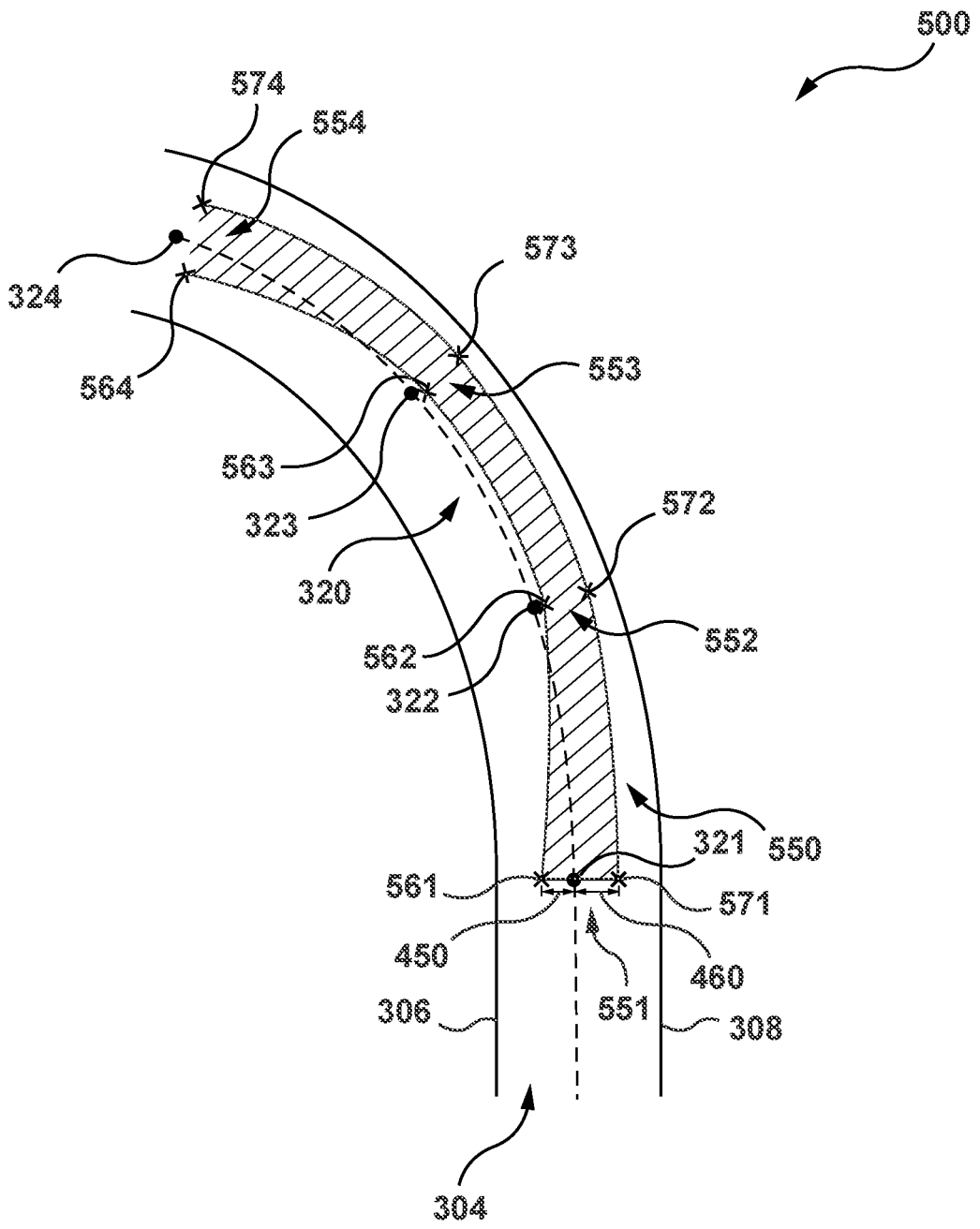
FIG. 5 depicts a safe deviation corridor that the electronic device of the networked computing environment of FIG. 2 is configured to determine, in accordance with at least some embodiments of the present technology.

With reference to FIG. 5, during the generating process of the safe deviation corridor 550, the electronic device 210 may be configured to determine a respective safe deviation interval for a respective anchor point based on the respective pair of safe deviation distances. For example, the electronic device 210 may be configured to determine a first safe deviation interval 551 for the first anchor point 321 based on the pair of safe deviation distances 450 and 460.

The first safe deviation interval 551 is bounded by a pair of safe deviation boundaries, including a safe deviation boundary 561 and a safe deviation boundary 571. It should be noted that the electronic device 210 may be configured to determine the deviation boundary 561 as being a given point on the road segment 302 that is separated from the first anchor point 321 by the safe deviation distance 450. Similarly, the electronic device 210 may be configured to determine the safe deviation boundary 571 as being a given point on the road segment 302 that is separated from the first anchor point 321 by the distance 460.

Put another way, the electronic device 210 may be configured to determine the pair of safe deviation boundaries 561 and 571 of the first safe deviation interval 551 such that if the axis 356 of the vehicle 220 is positioned anywhere between the pair safe deviation boundaries 561 and 571, the vehicle 220 will fall within the constraints of the road segment 302.

The electronic device 210 may be configured to determine (i) a second safe deviation interval 552 for the second anchor point 322, (ii) a third safe deviation interval 553 for the third anchor point 323, and (iii) a fourth safe deviation interval 554 for the fourth anchor point 324, similarly to how the electronic device 210 is configured to determine the first safe deviation interval 551 for the first anchor point 321. Put another way, the electronic device 210 may be configured to determine (i) a pair of safe deviation boundaries 562 and 572 for the second anchor point 322 based on the pair of safe deviation distances associated with the second anchor point 322, (ii) a pair of safe deviation boundaries 563 and 573 for the third anchor point 323 based on the pair of safe deviation distances associated with the third anchor point 323, (i) a pair of safe deviation boundaries 564 and 574 for the fourth anchor point 324 based on the pair of safe deviation distances associated with the fourth anchor point 324, similarly to how the electronic device 210 is configured to determine the pair of safe deviation boundaries 561 and 571 for the first anchor point 321 based on the pair of safe deviation distances 450 and 460.

It should be noted that a given anchor point may or may not fall within a respective safe deviation interval, and that whether or not a given anchor point falls within the respective safe deviation interval will depend on inter alia the road segment data (e.g., the constraints of the road segment 302)

and the vehicle data (e.g., the geometry, the configuration and the size of the vehicle 220). For example, as seen in FIG. 5, the first anchor point 321 and the fourth anchor point 324 fall within the first safe deviation interval 551 and the fourth safe deviation interval 554, respectively. However, the second anchor point 322 does not fall within the second safe deviation interval 552, and the third anchor point does not fall within the third safe deviation interval 553.

For example, the second anchor point 322 is not falling within the second safe deviation interval 552 because when the bounding box 350 is positioned such that the axis 356 is aligned with the second anchor point 322 and such that the forward direction of travel is tangent to the reference path 320 at the second anchor point 322, the bounding box 350 at least partially overlaps the left boundary 306. Hence, it can be said that the safe deviation distance between (i) the left boundary 306 and (ii) the bounding box 350 when the bounding box 350 is positioned such that the axis 356 is aligned with the second anchor point 322 and such that the forward direction of travel is tangent to the reference path 320 at the second anchor point 322, is negative. As a result, the electronic device 210 may be configured to determine, based on this negative safe deviation distance that the safe deviation boundary 562 is to be positioned to the right of the second anchor point 322 and, thus, the second anchor point 322 does not fall within the second safe deviation interval 552.

Overall, it can be said that during the generating process of the safe deviation corridor 550, the electronic device 210 may be configured to, for each anchor point of the reference path 320, (i) determine a respective pair of safe deviation distances, such as the pair of the safe deviation distances 450 and 460 for the first anchor point 321, (ii) determine a respective safe deviation interval based on the respective pair of safe deviation distances, such as the first safe deviation interval 551 based on the pair of safe deviation distances 450 and 460 for the first anchor point 321, and (iii) determine the safe deviation corridor 550 as the section of the road segment 302 that is included within the respective safe deviation intervals, such as the first safe deviation interval 551, the second safe deviation interval 552, the third safe deviation interval 553, and the fourth safe deviation interval 554.

It should be noted that if the axis 356 of the bounding box 350 is positioned anywhere within the safe deviation corridor 550 and such that the forward direction of travel is tangent to the reference path 320 at the second anchor point 322, the vehicle 220 will be falling within the constraints of the road segment 302, or in other words, will not cross over the left boundary 306 and/or the right boundary 308 of the lane 304 on the road segment 302. It should also be noted that, as explained above, at least some of the anchor points of the reference path 320 may fall within the safe deviation corridor 550 while others may fall outside the safe deviation corridor 550.

It is contemplated that in some embodiments of the present technology, the electronic device 210 may be triggered to determine the amended path 620 if at least one anchor point of the reference path 320 falls outside the safe deviation corridor 550.

In other embodiments, however, even if all of the anchor points of the reference path 320 fall within the safe deviation corridor 550, the electronic device 210 may still be triggered to determine the amended path 620. For example, if the anchor points of the reference path 320 were all within the safe deviation corridor 550, this means that if the vehicle 220 follows such reference path 320 on the road segment 302, the vehicle 220 will fall within the constraints of the road segment 302. Nevertheless, in such a case, the electronic device 210 may still be triggered to determine the amended path 620 for increasing safety of the manoeuver, since the amended path 620 may be used to guide the vehicle 220 in a manner that increases the distances between the left and right boundaries 306 and 308 of the road segment 302 and the vehicle 220 if compared to the vehicle 220 being guided along the reference path 320.

How the electronic device 210 may be configured to determine the amended path 620 will now be described with reference to FIG. 6. The electronic device 210 may be configured to use the first safe deviation interval 551, the second safe deviation interval 552, the third safe deviation interval 553 and the fourth safe deviation interval 554 for determining respective amended anchor points of the amended path 620. In other words, the electronic device 210 may be configured to use:

the first safe deviation interval 551 to determine a first amended anchor point 621 of the amended path 620;

the second safe deviation interval 552 to determine a second amended anchor point 622 of the amended path 620;

the third safe deviation interval 553 to determine a third amended anchor point 623 of the amended path 620; and the fourth safe deviation interval 554 to determine a fourth amended anchor point 624 of the amended path 620.

In some embodiments of the present technology, the electronic device 210 may be configured to determine a given amended anchor point as a point corresponding to a midpoint of a respective safe deviation interval. Therefore, the electronic device 210 may be configured to determine:

a midpoint of the first safe deviation interval 551 and identify it as the first amended anchor point 621;

a midpoint of the second safe deviation interval 552 and identify it as the second amended anchor point 622;

a midpoint of the third safe deviation interval 553 and identify it as the third amended anchor point 623; and a midpoint of the fourth safe deviation interval 554 and identify it as the fourth amended anchor point 624.

As a result, it can be said that the electronic device 210 may be configured to determine the amended path 620 as a sequence of amended anchor points and where each amended anchor point in the sequence is determined by the electronic device 210 based on a respective safe deviation interval of the safe deviation corridor 550. It should be noted that since each amended anchor point is located within a respective safe deviation interval (and hence within the safe deviation corridor 550), if the vehicle 220 is travelling along the sequence of amended anchor points on the road segment 302, the vehicle 220 will fall within the constraints of the road segment 302.

Figure 6:
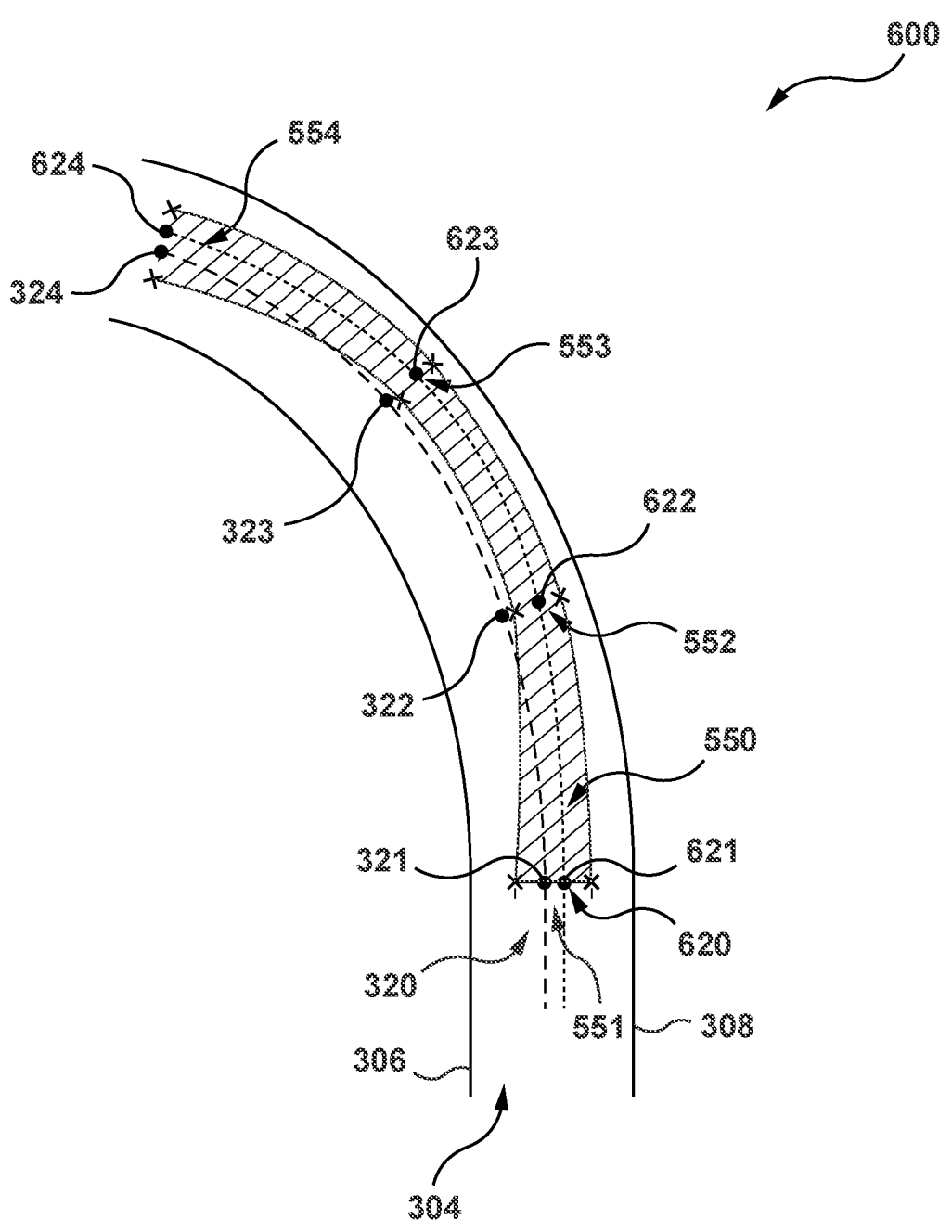
FIG. 6 depicts an amended path that the electronic device of the networked computing environment of FIG. 2 is configured to determine for the vehicle of the networked computing environment of FIG. 2 to travel through the road segment, in accordance with at least some embodiments of the present technology.
Figure 7:
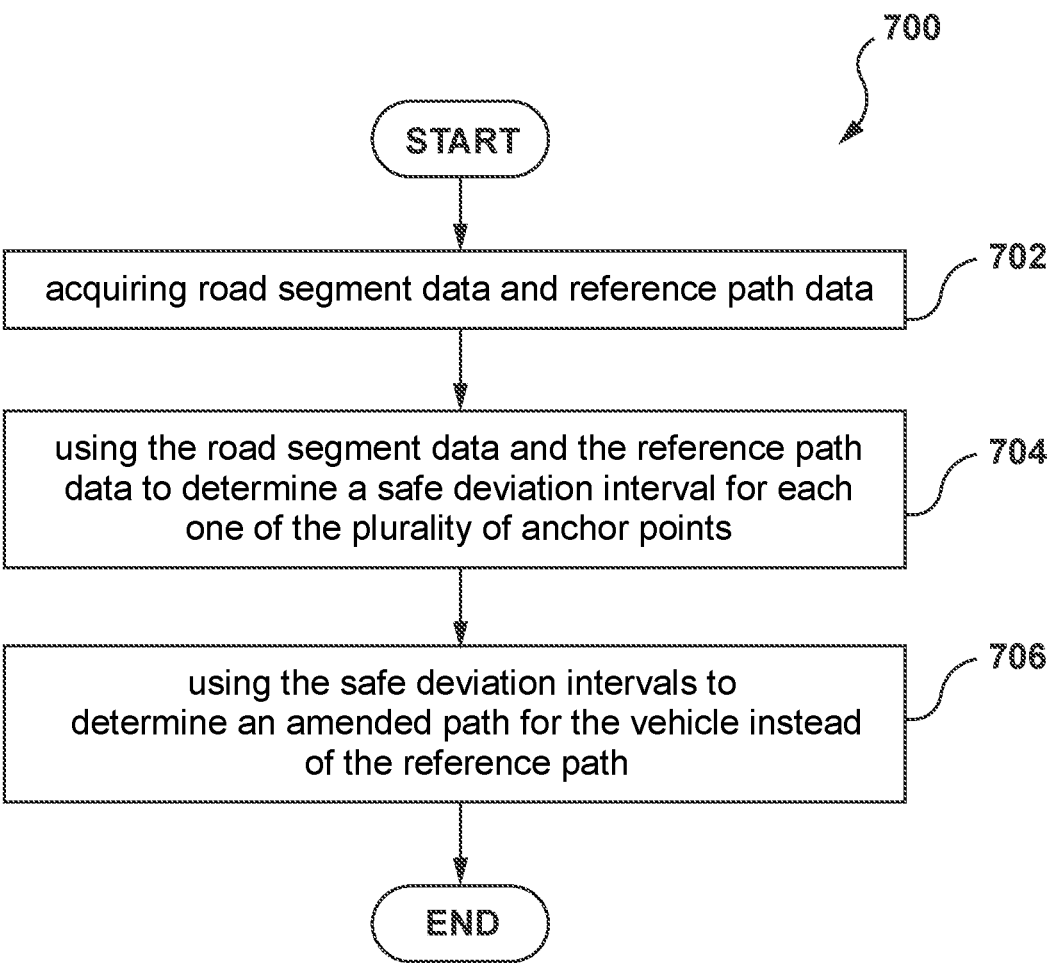
FIG. 7 is a schematic block diagram of a method of amending a reference path associated with the vehicle, in accordance with at least some embodiments of the present technology.

It is contemplated that the amended path 620 may be in a form of a polyline as depicted in FIG. 6. However, it is contemplated that the electronic device 210 may be configured to employ an interpolation procedure or others known methods to, in a sense, "smooth out" the amended path 620.

Figure 9:
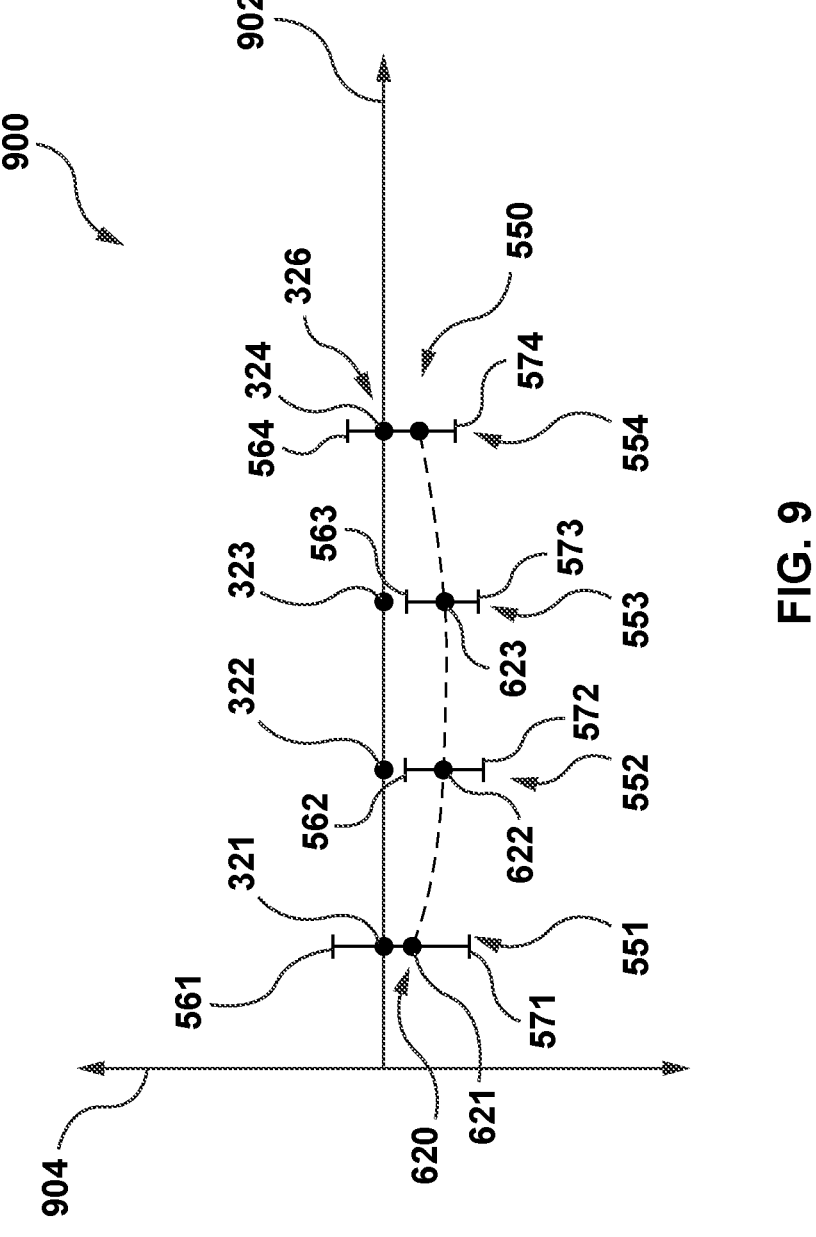
FIG. 9 depicts an alternative representation of the reference path of FIG. 3, of the safe deviation corridor of FIG. 5, and of the amended reference path of FIG. 6, in accordance with at least some embodiments of the present technology.

With reference to FIG. 9, there is depicted an alternative representation 900 of the reference path 320, the respective safety intervals of the safe deviation corridor 550, and the amended path 620. As seen, the plurality of anchor points of the reference path 320 is positioned on an axis 902. Also, for each one of the plurality of anchor points of the reference path 320, there is depicted a respective safe deviation interval that extends along an axis 904. Within each safe deviation interval, there is also depicted a respective amended anchor point of the amended path 620.

Once the amended path 620 is determined by the electronic device 210, the electronic device 210 may be configured to generate operation-control data for controlling operation or otherwise trigger operation of the vehicle 220 when travelling on the road segment 302. For example, the electronic device 210 may be configured to generate computer commands for triggering the vehicle 220 to follow the amended path 620, instead of the reference path 320, along the road segment 302.

In some embodiments of the present technology, it is contemplated that during the anchor-by-anchor verification procedure performed by the electronic device 210 for determining the pair of safe deviation distances for respective anchor points of the reference path 320, the electronic device 210 may be configured to employ an enlarged simulated representation of the vehicle 220 as opposed to the bounding box 350. Recalling that bounding box 350 in FIG. 3 occupies a substantially same area on the simulated representation of the road segment 302 as the surface area occupied by the vehicle 220 on the road segment 302, this means that the electronic device 210 may be configured to employ a given enlarged bounding box such that the enlarged bounding box occupies a substantially larger area on the simulated representation of the road segment 302 than the surface area occupied by the vehicle 220 on the road segment 302. The electronic device 210 employing the given enlarged bounding box instead of the bounding box 350 will result in smaller safe deviation distances determined for each anchor point of the reference path 320 and, in turn, in a safety deviation corridor occupying a smaller section of the road segment 302 if compared to the safety deviation corridor 550.

Therefore, it is contemplated that employing the given enlarged bounding box instead of the bounding box 350 for determining a given amended path may further reduce the likelihood of the vehicle 220 falling outside the constraints of the road segment 302 when following the given amended path in comparison to when the electronic device 210 is configured to employ the bounding box 350 for determining the amended path 620.

In some embodiments, the electronic device 210 may be configured to generate the enlarged simulated representation of the vehicle 220 by artificially increasing the area covered by the bounding box 350. In one example, the electronic device 210 may be configured to generate an enlarged bounding box by proportionally increasing the width and/or the length of the bounding box 350. In an other example, the electronic device 210 may be configured to generate the enlarged simulated representation of the vehicle 220 by partially rotating (e.g. +/−20 degrees) the bounding box 350 about the axis 356 and use the effective area covered by the bounding box 350 during the partial rotation as the enlarged simulated representation of the vehicle 220.

In further embodiments, the electronic device 210 may implement a reference path calculation module. The reference path calculation module may be configured to perform the anchor-by-anchor verification procedure as described above. In addition, the reference path calculation module may be configured to generate the amended path 620 as described above.

In some embodiments of the present technology, the electronic device 210 may be configured to store and analyze data about the dynamic objects in neighboring lanes. For example, the electronic device 210 may be configured to implement a dynamic object tracking module, or simply dynamic object tracker. For example, the electronic device 210 may be configured to employ the dynamic object tracker for determining reference paths for respective dynamic objects relative to the center lines of the respective lanes in which the given objects is travelling.

It is contemplated that the dynamic object tracker may be configured to determine the center lines of respective lanes in which a given object (such as a neighboring vehicle) is travelling similarly to how the electronic device 210 is configured to determine the center line of the lane 304.

In some cases, the dynamic objects tracker may be configured to detect when the position of the dynamic object relating to the center line of the respective lane increases. In such cases, the dynamic object tracker may be configured to determine, in response to such increase, that the dynamic object is attempting a lane-changing maneuver. Data indicative of such determination by the dynamic object tracker may be transmitted to the reference path calculation module.

For example, data indicative of that the dynamic object is attempting a lane-changing manoeuver may be used by the electronic device 210 for control operation of the vehicle 220 so as to avoid or at least reduce a risk of collision between the dynamic object and the vehicle 220.

In some embodiments, the bounding box modelling module may be used for generating a bounding box for the dynamic object similarly to how the bounding box modelling module is configured to generate the bounding box 350 (and/or enlarged representations of the vehicle 220) for the vehicle 220. In addition, the reference path calculation module may be configured to generate a given reference path and/or an amended path for a respective dynamic object similarly to how the reference path calculation module is configured to determine the reference path 320 and/or the amended path 620 for the vehicle 220.

In some embodiments of the present technology, the electronic device 210 may be configured to execute a method 700 of amending the reference path 320 associated with the vehicle 220. The method 700 will now be described in greater details.

STEP 702: Acquiring Road Segment Data and Reference Path Data

The method 700 begins at step 702 with the electronic device 210 configured to acquire the road segment data and the reference path data. The road segment data is indicative of constraints of the road segment 302. The constraints may comprise at least one of (i) physical constraints on the road segment 302, and (ii) road rule constraints on the road segment 302 as explained above.

The reference path data having a plurality of anchor points defining the reference path 320 along the road segment 302. It should be noted that the electronic device 210 may be configured to generate the reference path 320. For example, the electronic device 210 may be configured to defining the plurality of anchor points along the center line of the lane 304, as explained above.

In some embodiments, the distance between the plurality of anchor points may depend on at least a velocity of the vehicle 220 during the generation of the reference path 320.

STEP 704: Using the Road Segment Data and the Reference Path Data to Determine a Safe Deviation Interval for Each One of the Plurality of Anchor Points The method 700 continues to step 704 with the electronic device 210 configured to use the road segment data and the reference path data to determine a respective safe deviation interval for each one of the plurality of anchor points. It should be noted that a given safe deviation interval for a given anchor point is indicative of an acceptable deviation of the vehicle 220 from the reference path 320, as explained above, such that if the vehicle 220 is located within the given safe deviation interval the vehicle 220 falls within the constraints of the road segment 302. The safe deviation intervals form the safety corridor 550 for the vehicle 220 as depicted in FIG. 5.

It should be noted that the electronic device 210 may be configured to perform the generating process of the safe deviation corridor 550 as part of the step 704. As previously discussed, the safe deviation corridor 550 defining a section of the road segment 302 in which the vehicle 220 falls within the constraints of the road segment 302.

In some embodiments, the step 706 may comprise the electronic device 210 configured to generate a simulated representation of the vehicle 220 for a respective anchor point from the plurality of anchor points on the simulated representation of the road segment 302. For example, the electronic device 210 may be configured to generate the bounding box 350 and position it at respective anchor points from the plurality of anchor points as explained above for determining the respective safe deviation intervals of the respective anchor points.

In other embodiments, the simulated representation of the vehicle 220 may be generated by the electronic device 210 such that it covers an artificially increased surface on the simulated representation of the road segment 302. The artificially increased surface us larger than an actual surface that the vehicle 220 covers of the road segment 302. For example, the electronic device 210 may be configured to generate the enlarged representation of the vehicle 220, as explained above. In one example, the electronic device 210 may be configured to generate an enlarged bounding box by proportionally increasing the width and/or the length of the bounding box 350.

It is contemplated that the simulated representation of the vehicle 220 may cover an actual surface on the simulated representation of the road segment 302, and the electronic device 210 may be configured to, as part of the determining the safe deviation intervals of the respective anchor points, rotating the simulated presentation using a pre-determined angle to generate an enlarged projection of the vehicle 220 onto the road segment 302. For example, the electronic device 210 may be configured to generate the enlarged simulated representation of the vehicle 220 by partially rotating (e.g. +/−20 degrees) the bounding box 350 about the axis 356 and use the effective area covered by the bounding box 350 during the partial rotation as the enlarged simulated representation of the vehicle 220 for the purpose of determining the respective safe intervals for the safe deviation corridor 550.

STEP 706: Using the Safe Deviation Intervals to Determine an Amended Path for the Vehicle Instead of the Reference Path The method 700 continues to step 706 with the electronic device 210 configured to use the safe deviation intervals to determine the amended path 620 for the vehicle 220 instead of the reference path 320, such that by following the amended path 620 the vehicle 220 falls within the constraints of the road segment 302. It should be noted that the amended path 620 falls within the safe deviation corridor 550.

In some embodiments, the electronic device 210 may be configured to determine amended anchor points for the respective safe deviation intervals, when using the safe deviation intervals to determine the amended path 620, such that a given amended anchor point falls within the respective safe deviation interval. The electronic device 210 may be configured to determine the amended path 620 as being a sequence of the amended anchor points and where the given amended anchor point corresponds to a midpoint of the respective safe interval.

It is contemplated that the sequence of the amended anchor points may be in a form of a polyline.

In some embodiments of the present technology, the electronic device 210 may also be configured to generate operation-control data for controlling operation of the vehicle 220, and where the operation-control data represents computer commands for the vehicle 220 to follow the amended path 620 along the road segment 302.

In some embodiments, the vehicle 220 may be located near or in proximity to an other vehicle on the road segment 302. It is contemplated that at least some steps of the method 700 may be performed for the neighboring vehicle by the electronic device 210.

In some embodiments, when generating a given reference path for the neighboring vehicle, the electronic device 210 may be configured to access a database of historical maneuvers associated with the neighboring vehicle and generate a predicted the reference path for the neighboring vehicle. In some embodiments, the predicted reference path of the neighboring vehicle may be used for modifying a current path of the vehicle 220 along the road segment 302.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implemented method of amending a reference path associated with a vehicle, the reference path being a path along a road segment that the vehicle is estimated to follow, the method comprising:

acquiring road segment data and reference path data, the road segment data being indicative of constraints of the road segment, and the reference path data having a plurality of anchor points defining the reference path along the road segment;

using the road segment data and the reference path data to determine a respective safe deviation interval for each one of the plurality of anchor points, by:

generating a simulated representation of the vehicle for a respective anchor point from the plurality of anchor points on a simulated representation of the road segment, the generating comprising:

generating a bounding box occupying a substantially same area on the simulated representation of the road segment as a surface occupied by the vehicle:

generating a simulated representation of a rear axle of the vehicle within the bounding box;

determining a rotation axis of the vehicle as an axis extending through a midpoint of the simulated representation of the rear axle in the bounding box, the rotation axis extending upwardly and perpendicular to a ground surface on which the vehicle is travelling;

rotating, at each one of the plurality of anchor points, the bounding box around the rotation axis by a pre-determined angle to generate an enlarged projection of the vehicle onto the road segment;

determining the simulated representation of the vehicle as the enlarged projection thereof; and determining the respective safe deviation intervals of the respective anchor points from the plurality of anchor points based on the simulated representation of the vehicle on the simulated representation of the road segment, a given safe deviation interval for the respective anchor point of the plurality of anchor points being an interval within which the respective anchor point is to be located in order for the vehicle to fall within the constraints of the road segment when passing the respective anchor point;

determining whether any anchor points of the plurality of anchor points fall outside of the respective safe deviation intervals;

in response to determining that one or more anchor points of the plurality of anchor points fall outside of their respective safe deviation intervals:

moving each of the one or more anchor points that fall outside of their respective safe deviation intervals to within their respective safe deviation interval; and generating an amended path as a path extending through the plurality of anchor points after the moving.

2. The method of claim 1, wherein the respective safe deviation intervals form a safe deviation corridor for the vehicle, the safe deviation corridor defining a section of the road segment in which the vehicle falls within the constraints of the road segment.

3. The method of claim 2, wherein the amended path falls within the safe deviation corridor.

4. The method of claim 1, wherein the constraints comprise at least one of (i) physical constraints on the road segment, and (ii) road rule constraints on the road segment.

5. The method of claim 1, wherein the method is executed by an electronic device that is associated with a Self-Driving Car (SDC).

6. The method of claim 1, wherein the moving the one or more anchor points that fall outside the respective safe deviation intervals comprises moving the one or more anchor points to respective midpoints of the respective safe deviation intervals.

7. The method of claim 1, wherein the method further comprises generating the reference path.

8. The method of claim 5, wherein the SDC is different from the vehicle, and wherein the method further comprises generating the reference path by: accessing a database of historical maneuvers associated with the vehicle and generating a prediction of the reference path.

9. The method of claim 5, wherein the SDC is located in proximity to the vehicle on the road segment.

10. The method of claim 9, wherein the method further comprises:

using the amended path of the vehicle for modifying a current path of the SDC along the road segment.

11. The method of claim 1, wherein the simulated representation of the vehicle covers an artificially increased surface on the simulated representation of the road segment, the artificially increased surface being larger than an actual surface that the vehicle covers of the road segment.

12. The method of claim 1, wherein the generating the amended path comprises:

determining amended anchor points for the respective safe deviation intervals, such that a given amended anchor point falls within the respective safe deviation interval; and determining, by the electronic device the amended path as being a sequence of the amended anchor points.

13. The method of claim 12, wherein the given amended anchor point corresponds to a midpoint of the respective safe interval.

14. The method of claim 12, wherein the sequence of the amended anchor points comprises a polyline.

15. The method of claim 1, further comprising defining the plurality of anchor points.

16. The method of claim 15, wherein the defining is based on at least a velocity of the vehicle.

17. An electronic device for amending a reference path associated with a vehicle, the reference path being a path along a road segment that the vehicle is estimated to follow, the electronic device comprising at least one processor and at least one non-transitory computer-readable memory storing executable instructions, which, when executed by the at least one processor, cause the electronic device to:

acquire road segment data and reference path data, the road segment data being indicative of constraints of the road segment, the reference path data having a plurality of anchor points defining the reference path along the road segment;

use the road segment data and the reference path data to determine a respective safe deviation interval for each one of the plurality of anchor points, by:

generating a simulated representation of the vehicle for a respective anchor point from the plurality of anchor points on a simulated representation of the road segment, the generating comprising:

generating a bounding box occupying a substantially same area on the simulated representation of the road segment as a surface occupied by the vehicle;

generating a simulated representation of a rear axle of the vehicle within the bounding box;

determining a rotation axis of the vehicle as an axis extending through a midpoint of the simulated representation of the rear axle in the bounding box, the rotation axis extending upwardly and perpendicular to a ground surface on which the vehicle is travelling:

rotating, at each one of the plurality of anchor points, the bounding box around the rotation axis by a pre-determined angle to generate an enlarged projection of the vehicle onto the road segment;

determining the simulated representation of the vehicle as the enlarged projection thereof; and determining the respective safe deviation intervals of the respective anchor points from the plurality of anchor points based on the simulated representation of the vehicle on the simulated representation of the road segment, a given safe deviation interval for the respective anchor point of the plurality of anchor points being an interval within which the respective anchor point is to be located in order for the vehicle to fall within the constraints of the road segment when passing the respective anchor point;

determine whether any anchor points of the plurality of anchor points fall outside of the respective safe deviation intervals;

in response to determining that one or more anchor points of the plurality of anchor points fall outside of their respective safe deviation intervals:

move each of the one or more anchor points that fall outside of their respective safe deviation intervals to within their respective safe deviation interval; and generate an amended path as a path extending through the plurality of anchor points after the moving.

\* \* \* \* \*